(12) United States Patent
Koo et al.

(10) Patent No.: US 11,750,817 B2
(45) Date of Patent: Sep. 5, 2023

(54) IMAGE CODING METHOD BASED ON TRANSFORM AND APPARATUS THEREFOR

(71) Applicant: LG Electronics Inc., Seoul (KR)

(72) Inventors: Moonmo Koo, Seoul (KR); Hyeongmoon Jang, Seoul (KR); Seunghwan Kim, Seoul (KR); Jaehyun Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/729,917

(22) Filed: Apr. 26, 2022

(65) Prior Publication Data

US 2022/0264102 A1 Aug. 18, 2022

Related U.S. Application Data

(63) Continuation of application No. PCT/KR2020/014924, filed on Oct. 29, 2020.

(60) Provisional application No. 62/927,668, filed on Oct. 29, 2019.

(51) Int. Cl.
*H04N 19/132* (2014.01)
*H04N 19/159* (2014.01)
*H04N 19/176* (2014.01)
*H04N 19/186* (2014.01)

(52) U.S. Cl.
CPC ......... *H04N 19/132* (2014.11); *H04N 19/159* (2014.11); *H04N 19/176* (2014.11); *H04N 19/186* (2014.11)

(58) Field of Classification Search
CPC .. H04N 19/132; H04N 19/159; H04N 19/176; H04N 19/186
See application file for complete search history.

(56) References Cited

U.S. PATENT DOCUMENTS

2019/0313130 A1* 10/2019 Zhang ............... H04N 19/46
2021/0099702 A1* 4/2021 Egilmez ............ H04N 19/186

FOREIGN PATENT DOCUMENTS

| KR | 20170107448 | 9/2017 |
| KR | 20190035739 | 4/2019 |
| KR | 20190042090 | 4/2019 |

(Continued)

OTHER PUBLICATIONS

Bross et al., "Versatile Video Coding (Draft 7)," JVET-P2001-vA, Presented at Joint Video Experts Team (JVET) of ITU-T SG 16 WP 3 and ISO/IEC JTC 1/SC 29/WG 11, 16th Meeting: Geneva, CH, Oct. 1-11, 2019, 484 pages (Year: 2019).*

(Continued)

*Primary Examiner* — Hesham K Abouzahra
(74) *Attorney, Agent, or Firm* — Fish & Richardson P.C.

(57) ABSTRACT

An image decoding method according to the present document comprises the steps of: on the basis of an intra prediction mode of a chroma block being a cross-component linear model (CCLM) mode and an intra prediction mode of a luma block corresponding to the chroma block being a palette mode, updating the intra prediction mode of the chroma block to an intra DC mode; on the basis of the updated intra prediction mode, determining an LFNST set including LFNST matrices; and performing LFNST on the chroma block on the basis of an LFNST matrix derived from the LFNST set, wherein the intra DC mode is an intra prediction mode corresponding to a specific location within the luma block.

14 Claims, 20 Drawing Sheets

(56) References Cited

FOREIGN PATENT DOCUMENTS

KR       20190057159       5/2019
WO      WO-2020260313 A1 * 12/2020   ........... H04N 19/105

OTHER PUBLICATIONS

Bross et al., "Versatile Video Coding (Draft 7)," JVET-P2001-vA, Presented at Joint Video Experts Team (JVET) of ITU-T SG 16 WP 3 and ISO/IEC JTC 1/SC 29/WG 11, 16th Meeting: Geneva, CH, Oct. 1-11, 2019, 484 pages.

\* cited by examiner

FIG. 8
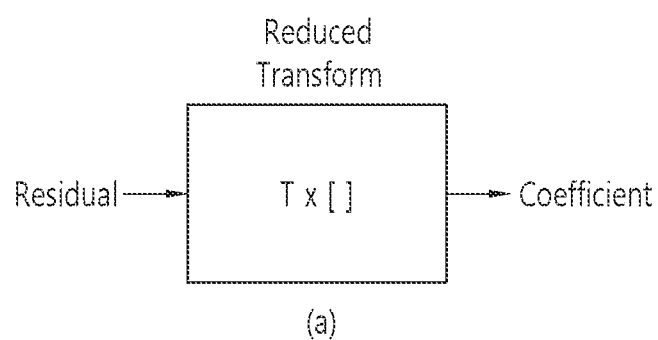
(a)
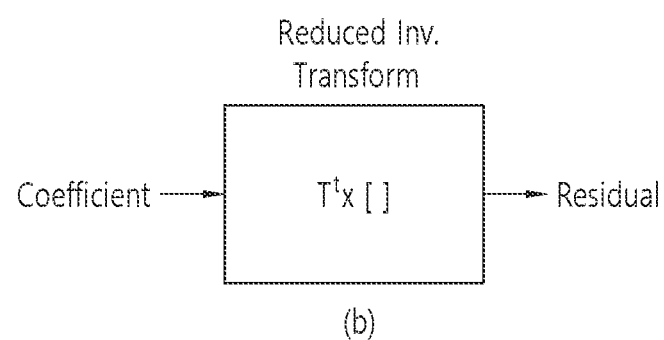
(b)

FIG. 9

| 1 | 2 | 3 | 4 | 5 | 6 | 7 | 8 |
|---|---|---|---|---|---|---|---|
| 9 | 10 | 11 | 12 | 13 | 14 | 15 | 16 |
| 17 | 18 | 19 | 20 | 21 | 22 | 23 | 24 |
| 25 | 26 | 27 | 28 | 29 | 30 | 31 | 32 |
| 33 | 34 | 35 | 36 | | | | |
| 37 | 38 | 39 | 40 | | | | |
| 41 | 42 | 43 | 44 | | | | |
| 45 | 46 | 47 | 48 | | | | |

| 1 | 2 | 3 | 4 |
|---|---|---|---|
| 5 | 6 | 7 | 8 |
| 9 | 10 | 11 | 12 |
| 13 | 14 | 15 | 16 |

(a)

| 1 | 9 | 17 | 25 | 33 | 37 | 41 | 45 |
|---|---|---|---|---|---|---|---|
| 2 | 10 | 18 | 26 | 34 | 38 | 42 | 46 |
| 3 | 11 | 19 | 27 | 35 | 39 | 43 | 47 |
| 4 | 12 | 20 | 28 | 36 | 40 | 44 | 48 |
| 5 | 13 | 21 | 29 | | | | |
| 6 | 14 | 22 | 30 | | | | |
| 7 | 15 | 23 | 31 | | | | |
| 8 | 16 | 24 | 32 | | | | |

| 1 | 5 | 9 | 13 |
|---|---|---|---|
| 2 | 6 | 10 | 14 |
| 3 | 7 | 11 | 15 |
| 4 | 8 | 12 | 16 |

FIG. 11
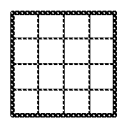 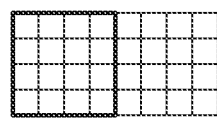 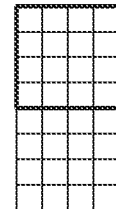
(a) 4x4  (b) 8x4 / 4x8
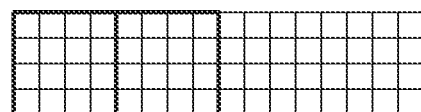 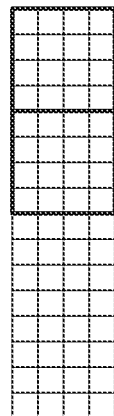 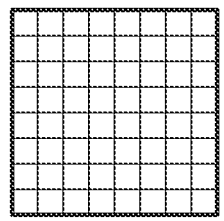
(c) 4xN / Nx4, when N≥16  (d) 8x8
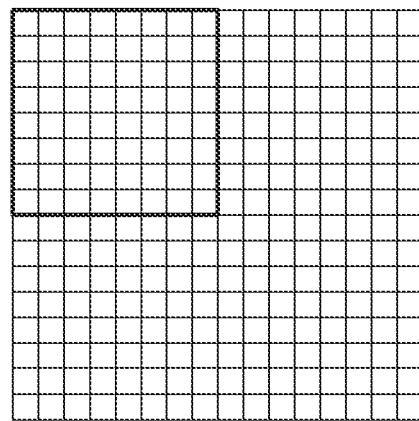
(e) MxN(M≥8, N≥8, M>8 or N>8)

FIG. 12
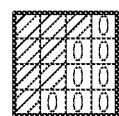
(a) 4x4  (b) 8x4 / 4x8
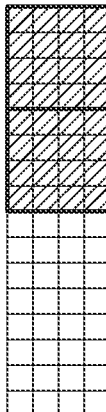
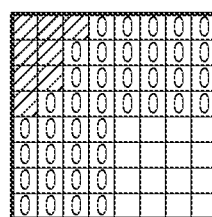
(c) 4xN / Nx4, when N≥16  (d) 8x8
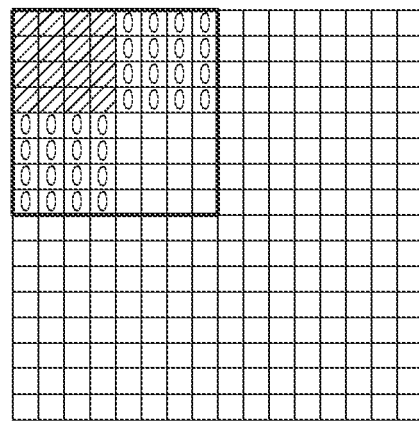
(e) MxN(M≥8, N≥8, M>8 or N>8)

FIG. 13
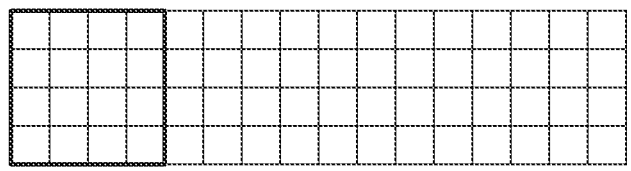 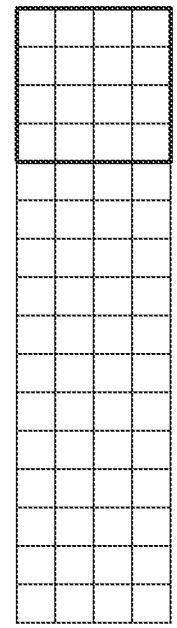
4xN / Nx4, when N≥16

(c) 4xN / Nx4, when N≥16

(d) 4xN / Nx4, when N≥16

(b) MxN(M≥8, N≥8, M>8 or N>8)

FIG. 16

FIG. 17 horizontal traverse scan (a)

vertical traverse scan (b)

IMAGE CODING METHOD BASED ON TRANSFORM AND APPARATUS THEREFOR

CROSS-REFERENCE TO RELATED APPLICATIONS

Pursuant to 35 U.S.C. § 119(e), this application is a continuation of International Application No. PCT/KR2020/014924, with an international filing date of Oct. 29, 2020, which claims the benefit of U.S. Provisional Patent Application No. 62/927,668, filed on Oct. 29, 2019, the contents of which are hereby incorporated by reference herein in its entirety.

TECHNICAL FIELD

The present disclosure relates to an image coding technique and, more particularly, to a method and an apparatus for coding an image based on transform in an image coding system.

RELATED ART

Nowadays, the demand for high-resolution and high-quality images/videos such as 4K, 8K or more ultra high definition (UHD) images/videos has been increasing in various fields. As the image/video data becomes higher resolution and higher quality, the transmitted information amount or bit amount increases as compared to the conventional image data. Therefore, when image data is transmitted using a medium such as a conventional wired/wireless broadband line or image/video data is stored using an existing storage medium, the transmission cost and the storage cost thereof are increased.

Further, nowadays, the interest and demand for immersive media such as virtual reality (VR), artificial reality (AR) content or hologram, or the like is increasing, and broadcasting for images/videos having image features different from those of real images, such as a game image is increasing.

Accordingly, there is a need for a highly efficient image/video compression technique for effectively compressing and transmitting or storing, and reproducing information of high resolution and high quality images/videos having various features as described above.

SUMMARY

A technical aspect of the present disclosure is to provide a method and an apparatus for increasing image coding efficiency.

Another technical aspect of the present disclosure is to provide a method and an apparatus for increasing efficiency in coding an LFNST index.

Still another technical aspect of the present disclosure is to provide a method and an apparatus for increasing efficiency of a second transform through coding of an LFNST index.

Yet another technical aspect of the present disclosure is to provide an image coding method and an image coding apparatus for deriving an LFNST transform set using an intra mode for a luma block in a CCLM mode.

According to an embodiment of the present disclosure, there is provided an image decoding method performed by a decoding apparatus. The method may include: updating an intra prediction mode of a chroma block to an intra DC based on the intra prediction mode of the chroma block being a cross-component linear model (CCLM) mode and an intra prediction mode of a luma block corresponding to the chroma block being a palette mode; determining an LFNST set comprising LFNST matrices based on the updated intra prediction mode; and performing an LFNST on the chroma block based on the LFNST matrix derived from the LFNST set, the intra DC mode is an intra prediction mode corresponding to a specific position in the luma block.

The specific position is set based on a color format of the chroma block.

The specific position is a center position of the luma block.

the specific position is set to ((xTbY+(nTbW*SubWidthC)/2), (yTbY+(nTbH*SubHeightC)/2)), xTbY and yTbY denote top-left coordinates of the luma block, nTbW and nTbH denote a width and a height of the chroma block, and SubWidthC and SubHeightC denote variables corresponding to the color format.

When the color format is 4:2:0, SubWidthC and SubHeightC are 2, and when the color format is 4:2:2, SubWidthC is 2 and SubHeightC is 1.

When the intra prediction mode corresponding to the specific position is an MIP mode, the intra prediction mode of the chroma block is updated to an intra planar mode.

When the intra prediction mode corresponding to the specific position is an IBC mode, the intra prediction mode of the chroma block is updated to an intra DC mode.

According to another embodiment of the present disclosure, there is provided an image encoding method performed by an encoding apparatus. The method may include: updating an intra prediction mode of a chroma block to an intra DC based on the intra prediction mode of the chroma block being a cross-component linear model (CCLM) mode and an intra prediction mode of a luma block corresponding to the chroma block being a palette mode; determining an LFNST set comprising LFNST matrices based on the updated intra prediction mode; and performing an LFNST on the chroma block based on the residual samples and the LFNST matrix, the intra DC mode is an intra prediction mode corresponding to a specific position in the luma block.

According to still another embodiment of the present disclosure, there may be provided a digital storage medium that stores image data including encoded image information and a bitstream generated according to an image encoding method performed by an encoding apparatus.

According to yet another embodiment of the present disclosure, there may be provided a digital storage medium that stores image data including encoded image information and a bitstream to cause a decoding apparatus to perform the image decoding method.

According to the present disclosure, it is possible to increase overall image/video compression efficiency.

According to the present disclosure, it is possible to increase efficiency in coding an LFNST index.

According to the present disclosure, it is possible to increase efficiency of a second transform through coding of an LFNST index.

According to the present disclosure, it is possible to provide an image coding method and an image coding apparatus for deriving an LFNST transform set using an intra mode for a luma block in a CCLM mode.

The effects that can be obtained through specific examples of the present disclosure are not limited to the effects listed above. For example, there may be various technical effects that a person having ordinary skill in the related art can understand or derive from the present disclosure. Accordingly, specific effects of the present disclosure are not

BRIEF DESCRIPTION OF THE DRAWINGS

FIG. 8 is a diagram for explaining RST according to an embodiment of the present.

FIG. 9 is a diagram illustrating a sequence of arranging output data of a forward primary transformation into a one-dimensional vector according to an example.

FIG. 10 is a diagram illustrating a sequence of arranging output data of a forward secondary transform into a two-dimensional vector according to an example.

FIG. 11 is a diagram illustrating a block shape to which LFNST is applied.

FIG. 12 is a diagram illustrating an arrangement of output data of a forward LFNST according to an example.

FIG. 13 is a diagram illustrating that the number of output data for a forward LFNST is limited to a maximum of 16 according to an example.

FIG. 14 is a diagram illustrating zero-out in a block to which 4×4 LFNST is applied according to an example.

FIG. 15 is a diagram illustrating zero-out in a block to which 8×8 LFNST is applied according to an example.

FIG. 16 is a diagram illustrating zero-out in a block to which 8×8 LFNST is applied according to another example.

FIG. 17 is a diagram illustrating an example for explaining the horizontal and vertical traverse scan method used to code a palette index map.

DESCRIPTION OF EXEMPLARY EMBODIMENTS

Figure 1:
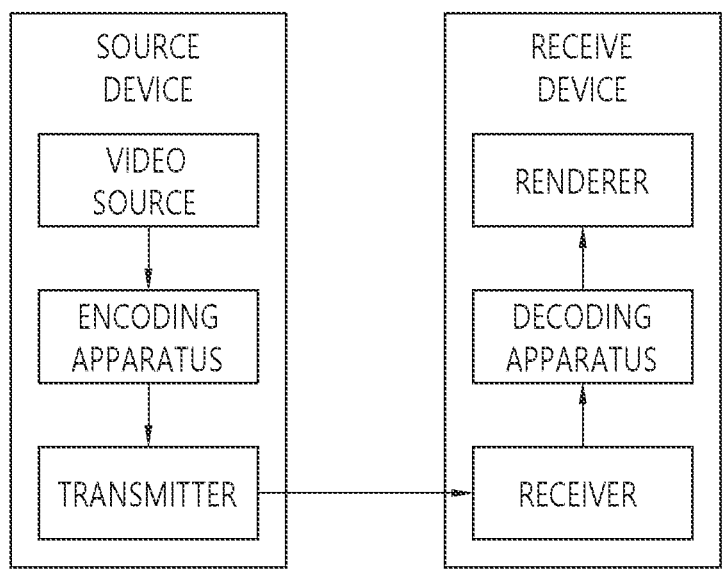
FIG. 1 schematically illustrates an example of a video/image coding system to which the present disclosure is applicable.

While the present disclosure may be susceptible to various modifications and include various embodiments, specific embodiments thereof have been shown in the drawings by way of example and will now be described in detail. However, this is not intended to limit the present disclosure to the specific embodiments disclosed herein. The terminology used herein is for the purpose of describing specific embodiments only, and is not intended to limit technical idea of the present disclosure. The singular forms may include the plural forms unless the context clearly indicates otherwise. The terms such as "include" and "have" are intended to indicate that features, numbers, steps, operations, elements, components, or combinations thereof used in the following description exist, and thus should not be understood as that the possibility of existence or addition of one or more different features, numbers, steps, operations, elements, components, or combinations thereof is excluded in advance.

Meanwhile, each component on the drawings described herein is illustrated independently for convenience of description as to characteristic functions different from each other, and however, it is not meant that each component is realized by a separate hardware or software. For example, any two or more of these components may be combined to form a single component, and any single component may be divided into plural components. The embodiments in which components are combined and/or divided will belong to the scope of the patent right of the present disclosure as long as they do not depart from the essence of the present disclosure.

Hereinafter, preferred embodiments of the present disclosure will be explained in more detail while referring to the attached drawings. In addition, the same reference signs are used for the same components on the drawings, and repeated descriptions for the same components will be omitted.

This document relates to video/image coding. For example, the method/example disclosed in this document may relate to a VVC (Versatile Video Coding) standard (ITU-T Rec. H.266), a next-generation video/image coding standard after VVC, or other video coding related standards (e.g., HEVC (High Efficiency Video Coding) standard (ITU-T Rec. H.265), EVC (essential video coding) standard, AVS2 standard, etc.).

In this document, a variety of embodiments relating to video/image coding may be provided, and, unless specified to the contrary, the embodiments may be combined to each other and be performed.

In this document, a video may mean a set of a series of images over time. Generally a picture means a unit representing an image at a specific time zone, and a slice/tile is a unit constituting a part of the picture. The slice/tile may include one or more coding tree units (CTUs). One picture may be constituted by one or more slices/tiles. One picture may be constituted by one or more tile groups. One tile group may include one or more tiles.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component. Alternatively, the sample may refer to a pixel value in the spatial domain, or when this pixel value is converted to the frequency domain, it may refer to a transform coefficient in the frequency domain.

A unit may represent the basic unit of image processing. The unit may include at least one of a specific region and information related to the region. One unit may include one luma block and two chroma (e.g., cb, cr) blocks. The unit and a term such as a block, an area, or the like may be used in place of each other according to circumstances. In a general case, an M×N block may include a set (or an array) of samples (or sample arrays) or transform coefficients consisting of M columns and N rows.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may include 1) only A, 2) only B, and/or 3) both A and B. In other words, the term "or" in this document should be interpreted to indicate "additionally or alternatively."

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "prediction (intra prediction)", it may mean that "intra prediction" is proposed as an example of "prediction". In other words, the "prediction" of the present disclosure is not limited to "intra prediction", and "intra prediction" may be proposed as an example of "prediction". In addition, when indicated as "prediction (i.e., intra prediction)", it may also mean that "intra prediction" is proposed as an example of "prediction".

Technical features individually described in one figure in the present disclosure may be individually implemented or may be simultaneously implemented.

FIG. 1 schematically illustrates an example of a video/image coding system to which the present disclosure is applicable.

Referring to FIG. 1, the video/image coding system may include a first device (source device) and a second device (receive device). The source device may deliver encoded video/image information or data in the form of a file or streaming to the receive device via a digital storage medium or network.

The source device may include a video source, an encoding apparatus, and a transmitter. The receive device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may obtain a video/image through a process of capturing, synthesizing, or generating a video/image. The video source may include a video/image capture device and/or a video/image generating device. The video/image capture device may include, for example, one or more cameras, video/image archives including previously captured video/images, or the like. The video/image generating device may include, for example, a computer, a tablet and a smartphone, and may (electronically) generate a video/image. For example, a virtual video/image may be generated through a computer or the like. In this case, the video/image capturing process may be replaced by a process of generating related data.

The encoding apparatus may encode an input video/image. The encoding apparatus may perform a series of procedures such as prediction, transform, and quantization for compression and coding efficiency. The encoded data (encoded video/image information) may be output in the form of a bitstream.

The transmitter may transmit the encoded video/image information or data output in the form of a bitstream to the receiver of the receive device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format, and may include an element for transmission through a broadcast/communication network. The receiver may receive/extract the bitstream and transmit the received/extracted bitstream to the decoding apparatus.

The decoding apparatus may decode a video/image by performing a series of procedures such as dequantization, inverse transform, prediction, and the like corresponding to the operation of the encoding apparatus.

The renderer may render the decoded video/image. The rendered video/image may be displayed through the display.

Figure 2:
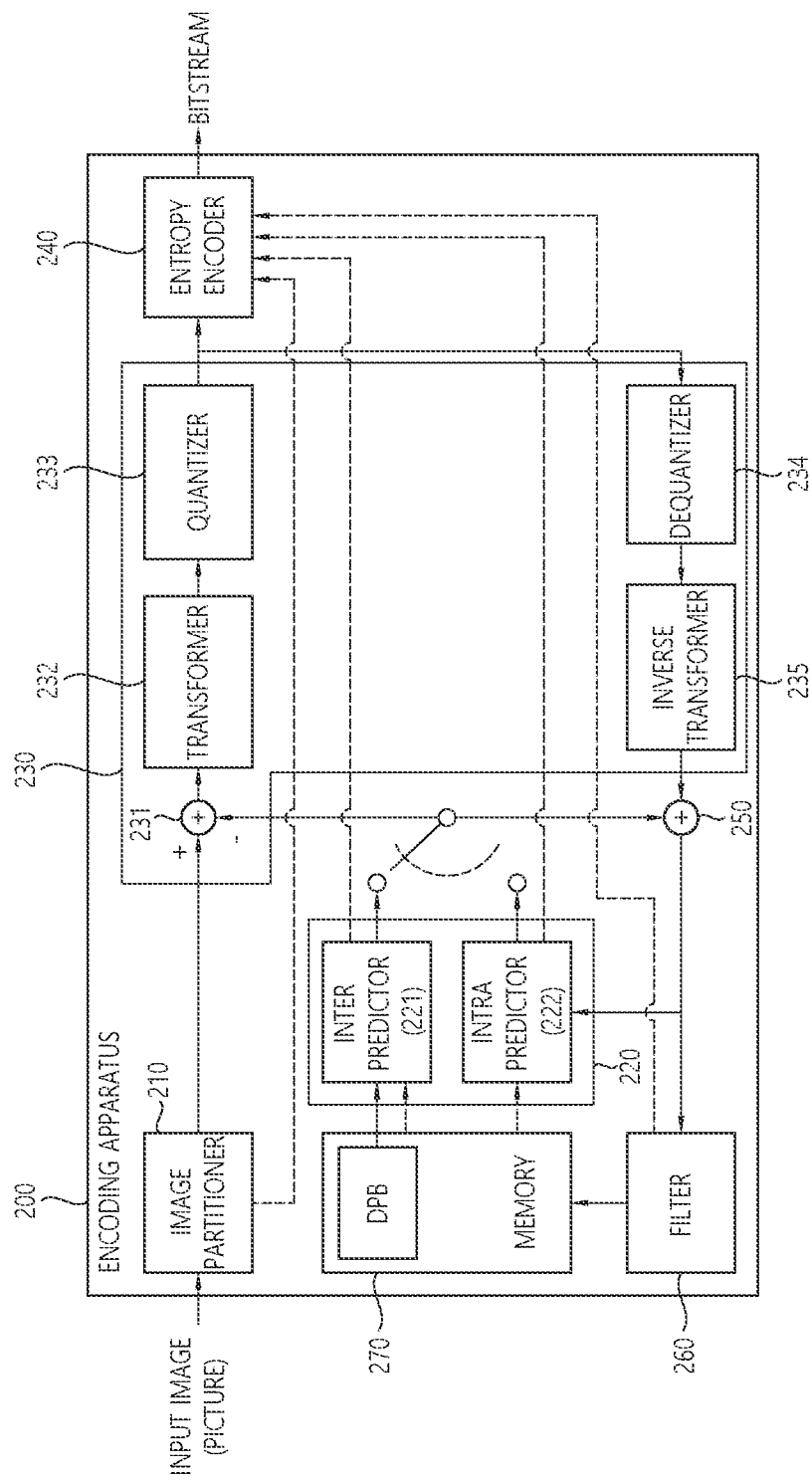
FIG. 2 is a diagram schematically illustrating a configuration of a video/image encoding apparatus to which the present disclosure is applicable.

FIG. 2 is a diagram schematically illustrating a configuration of a video/image encoding apparatus to which the present disclosure is applicable. Hereinafter, what is referred to as the video encoding apparatus may include an image encoding apparatus.

Referring to FIG. 2, the encoding apparatus 200 may include an image partitioner 210, a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, an inverse transformer 235. The residual processor 230 may further include a subtractor 231. The adder 250 may be called a reconstructor or reconstructed block generator. The image partitioner 210, the predictor 220, the residual processor 230, the entropy encoder 240, the adder 250, and the filter 260, which have been described above, may be constituted by one or more hardware components (e.g., encoder chipsets or processors) according to an embodiment. Further, the memory 270 may include a decoded picture buffer (DPB), and may be constituted by a digital storage medium. The hardware component may further include the memory 270 as an internal/external component.

The image partitioner 210 may partition an input image (or a picture or a frame) input to the encoding apparatus 200 into one or more processing units. As one example, the processing unit may be called a coding unit (CU). In this case, starting with a coding tree unit (CTU) or the largest coding unit (LCU), the coding unit may be recursively partitioned according to the Quad-tree binary-tree ternary-tree (QTBTTT) structure. For example, one coding unit may be divided into a plurality of coding units of a deeper depth based on the quad-tree structure, the binary-tree structure, and/or the ternary structure. In this case, for example, the quad-tree structure may be applied first and the binary-tree structure and/or the ternary structure may be applied later. Alternatively, the binary-tree structure may be applied first. The coding procedure according to the present disclosure may be performed based on the final coding unit which is not further partitioned. In this case, the maximum coding unit may be used directly as a final coding unit based on coding efficiency according to the image characteristic. Alternatively, the coding unit may be recursively partitioned into coding units of a further deeper depth as needed, so that the coding unit of an optimal size may be used as a final coding unit. Here, the coding procedure may include procedures such as prediction, transform, and reconstruction, which will be described later. As another example, the processing unit may further include a prediction unit (PU) or a transform unit (TU). In this case, the prediction unit and the transform unit may be split or partitioned from the above-described final coding unit. The prediction unit may be a unit of sample prediction, and the transform unit may be a unit for deriving a transform coefficient and/or a unit for deriving a residual signal from a transform coefficient.

The unit and a term such as a block, an area, or the like may be used in place of each other according to circumstances. In a general case, an M×N block may represent a set of samples or transform coefficients consisting of M columns and N rows. The sample may generally represent a pixel or a value of a pixel, and may represent only a pixel/pixel value of a luma component, or only a pixel/pixel value of a chroma component. The sample may be used as a term corresponding to a pixel or a pel of one picture (or image).

The subtractor 231 subtracted a prediction signal (predicted block, prediction sample array) output from the predictor 220 from an input image signal (original block, original sample array) to generate a residual signal (residual block, residual sample array), and the generated residual signal is transmitted to the transformer 232. The predictor 220 may perform prediction on a processing target block (hereinafter, referred to as 'current block'), and may generate a predicted block including prediction samples for the current block. The predictor 220 may determine whether intra prediction or inter prediction is applied on a current block or CU basis. As discussed later in the description of each prediction mode, the predictor may generate various information relating to prediction, such as prediction mode information, and transmit the generated information to the entropy encoder 240. The information on the prediction may be encoded in the entropy encoder 240 and output in the form of a bitstream.

The intra predictor 222 may predict the current block by referring to samples in the current picture. The referred samples may be located in the neighbor of or apart from the current block according to the prediction mode. In the intra prediction, prediction modes may include a plurality of non-directional modes and a plurality of directional modes. The non-directional modes may include, for example, a DC mode and a planar mode. The directional mode may include, for example, 33 directional prediction modes or 65 directional prediction modes according to the degree of detail of the prediction direction. However, this is merely an example, and more or less directional prediction modes may be used depending on a setting. The intra predictor 222 may determine the prediction mode applied to the current block by using the prediction mode applied to the neighboring block.

The inter predictor 221 may derive a predicted block for the current block based on a reference block (reference sample array) specified by a motion vector on a reference picture. At this time, in order to reduce the amount of motion information transmitted in the inter prediction mode, the motion information may be predicted on a block, subblock, or sample basis based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block existing in the current picture and a temporal neighboring block existing in the reference picture. The reference picture including the reference block and the reference picture including the temporal neighboring block may be same to each other or different from each other. The temporal neighboring block may be called a collocated reference block, a collocated CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion information prediction (motion vector prediction, MVP) mode, the motion vector of the neighboring block may be used as a motion vector predictor and the motion vector of the current block may be indicated by signaling a motion vector difference.

The predictor 220 may generate a prediction signal based on various prediction methods. For example, the predictor may apply intra prediction or inter prediction for prediction on one block, and, as well, may apply intra prediction and inter prediction at the same time. This may be called combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). Although the IBC basically performs prediction in a current block, it can be performed similarly to inter prediction in that it derives a reference block in a current block. That is, the IBC may use at least one of inter prediction techniques described in the present disclosure.

The prediction signal generated through the inter predictor 221 and/or the intra predictor 222 may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a Karhunen-Loève transform (KLT), a graph-based transform (GBT), or a conditionally non-linear transform (CNT). Here, the GBT means transform obtained from a graph when relationship information between pixels is represented by the graph. The CNT refers to transform obtained based on a prediction signal generated using all previously reconstructed pixels. In addition, the transform process may be applied to square pixel blocks having the same size or may be applied to blocks having a variable size rather than the square one.

The quantizer 233 may quantize the transform coefficients and transmit them to the entropy encoder 240, and the entropy encoder 240 may encode the quantized signal (information on the quantized transform coefficients) and output the encoded signal in a bitstream. The information on the quantized transform coefficients may be referred to as residual information. The quantizer 233 may rearrange block type quantized transform coefficients into a one-dimensional vector form based on a coefficient scan order, and generate information on the quantized transform coefficients based on the quantized transform coefficients of the one-dimensional vector form. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (e.g. values of syntax elements, etc.) together or separately. Encoded information (e.g., encoded video/image information) may be transmitted or stored on a unit basis of a network abstraction layer (NAL) in the form of a bitstream. The video/image information may further include information on various parameter sets such as an adaptation parameter set (APS), a picture parameter set (PPS), a sequence parameter set (SPS), a video parameter set (VPS) or the like. Further, the video/image information may further include general constraint information. In the present disclosure, information and/or syntax elements which are transmitted/signaled to the decoding apparatus from the encoding apparatus may be included in video/image information. The video/image information may be encoded through the above-described encoding procedure and included in the bitstream. The bitstream may be transmitted through a network, or stored in a digital storage medium. Here, the network may include a broadcast network, a communication network and/or the like, and the digital storage medium may include various storage media such as USB, SD, CD, DVD, Blu-ray, HDD, SSD, and the like. A transmitter (not shown) which transmits a signal output from the entropy encoder 240 and/or a storage (not shown) which stores it may be configured as an internal/external element of the encoding apparatus 200, or the transmitter may be included in the entropy encoder 240.

Quantized transform coefficients output from the quantizer 233 may be used to generate a prediction signal. For example, by applying dequantization and inverse transform to quantized transform coefficients through the dequantizer 234 and the inverse transformer 235, the residual signal (residual block or residual samples) may be reconstructed. The adder 155 adds the reconstructed residual signal to a prediction signal output from the inter predictor 221 or the intra predictor 222, so that a reconstructed signal (reconstructed picture, reconstructed block, reconstructed sample array) may be generated. When there is no residual for a processing target block as in a case where the skip mode is applied, the predicted block may be used as a reconstructed block. The adder 250 may be called a reconstructor or a reconstructed block generator. The generated reconstructed signal may be used for intra prediction of a next processing target block in the current block, and as described later, may be used for inter prediction of a next picture through filtering.

Meanwhile, in the picture encoding and/or reconstructing process, luma mapping with chroma scaling (LMCS) may be applied.

The filter 260 may improve subjective/objective video quality by applying the filtering to the reconstructed signal. For example, the filter 260 may generate a modified reconstructed picture by applying various filtering methods to the reconstructed picture, and may store the modified reconstructed picture in the memory 270, specifically in the DPB of the memory 270. The various filtering methods may include, for example, deblocking filtering, sample adaptive offset, an adaptive loop filter, a bilateral filter or the like. As discussed later in the description of each filtering method, the filter 260 may generate various information relating to filtering, and transmit the generated information to the entropy encoder 240. The information on the filtering may be encoded in the entropy encoder 240 and output in the form of a bitstream.

The modified reconstructed picture which has been transmitted to the memory 270 may be used as a reference picture in the inter predictor 221. Through this, the encoding apparatus can avoid prediction mismatch in the encoding apparatus 100 and a decoding apparatus when the inter prediction is applied, and can also improve coding efficiency.

The memory 270 DPB may store the modified reconstructed picture in order to use it as a reference picture in the inter predictor 221. The memory 270 may store motion information of a block in the current picture, from which motion information has been derived (or encoded) and/or motion information of blocks in an already reconstructed picture. The stored motion information may be transmitted to the inter predictor 221 to be utilized as motion information of a neighboring block or motion information of a temporal neighboring block. The memory 270 may store reconstructed samples of reconstructed blocks in the current picture, and transmit them to the intra predictor 222.

Figure 3:
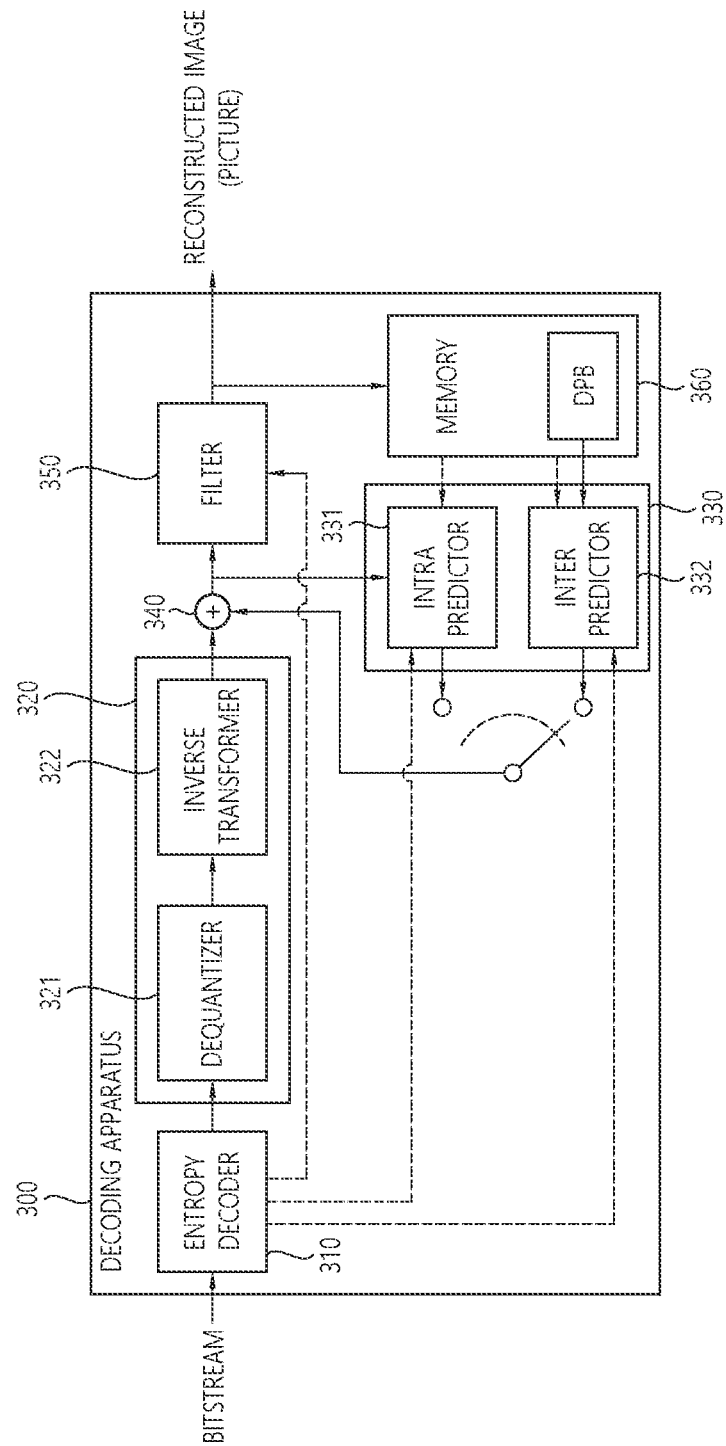
FIG. 3 is a diagram schematically illustrating a configuration of a video/image decoding apparatus to which the present disclosure is applicable.

FIG. 3 is a diagram schematically illustrating a configuration of a video/image decoding apparatus to which the present disclosure is applicable.

Referring to FIG. 3, the video decoding apparatus 300 may include an entropy decoder 310, a residual processor 320, a predictor 330, an adder 340, a filter 350 and a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350, which have been described above, may be constituted by one or more hardware components (e.g., decoder chipsets or processors) according to an embodiment. Further, the memory 360 may include a decoded picture buffer (DPB), and may be constituted by a digital storage medium. The hardware component may further include the memory 360 as an internal/external component.

When a bitstream including video/image information is input, the decoding apparatus 300 may reconstruct an image correspondingly to a process by which video/image information has been processed in the encoding apparatus of FIG. 2. For example, the decoding apparatus 300 may derive units/blocks based on information relating to block partition obtained from the bitstream. The decoding apparatus 300 may perform decoding by using a processing unit applied in the encoding apparatus. Therefore, the processing unit of decoding may be, for example, a coding unit, which may be partitioned along the quad-tree structure, the binary-tree structure, and/or the ternary-tree structure from a coding tree unit or a largest coding unit. One or more transform units may be derived from the coding unit. And, the reconstructed image signal decoded and output through the decoding apparatus 300 may be reproduced through a reproducer.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (e.g., video/image information) required for image reconstruction (or picture reconstruction). The video/image information may further include information on various parameter sets such as an adaptation parameter set (APS), a picture parameter set (PPS), a sequence parameter set (SPS), a video parameter set (VPS) or the like. Further, the video/image information may further include general constraint information. The decoding apparatus may decode a picture further based on information on the parameter set and/or the general constraint information. In the present disclosure, signaled/received information and/or syntax elements, which will be described later, may be decoded through the decoding procedure and be obtained from the bitstream. For example, the entropy decoder 310 may decode information in the bitstream based on a coding method such as exponential Golomb encoding, CAVLC, CABAC, or the like, and may output a value of a syntax element necessary for image reconstruction and quantized values of a transform coefficient regarding a residual. More specifically, a CABAC entropy decoding method may receive a bin corresponding to each syntax element in a bitstream, determine a context model using decoding target syntax element information and decoding information of neighboring and decoding target blocks, or information of symbol/bin decoded in a previous step, predict bin generation probability according to the determined context model and perform arithmetic decoding of the bin to generate a symbol corresponding to each syntax element value. Here, the CABAC entropy decoding method may update the context model using information of a symbol/bin decoded for a context model of the next symbol/bin after determination of the context model. Information on prediction among information decoded in the entropy decoder 310 may be provided to the predictor (inter predictor 332 and intra predictor 331), and residual values, that is, quantized transform coefficients, on which entropy decoding has been performed in the entropy decoder 310, and associated parameter information may be input to the residual processor 320. The residual processor 320 may derive a residual signal (residual block, residual samples, residual sample array). Further, information on filtering among information decoded in the entropy decoder 310 may be provided to the filter 350. Meanwhile, a receiver (not shown) which receives a signal output from the encoding apparatus may further constitute the decoding apparatus 300 as an internal/external element, and the receiver may be a component of the entropy decoder 310. Meanwhile, the decoding apparatus according to the present disclosure may be called a video/image/picture coding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may output transform coefficients by dequantizing the quantized transform coefficients. The dequantizer 321 may rearrange the quantized transform coefficients in the form of a two-dimensional block. In this case, the rearrangement may perform rearrangement based on an order of coefficient scanning which has been performed in the encoding apparatus. The dequantizer 321 may perform dequantization on the quantized transform coefficients using quantization parameter (e.g., quantization step size information), and obtain transform coefficients.

The deqauntizer 322 obtains a residual signal (residual block, residual sample array) by inverse transforming transform coefficients.

The predictor may perform prediction on the current block, and generate a predicted block including prediction samples for the current block. The predictor may determine whether intra prediction or inter prediction is applied to the current block based on the information on prediction output from the entropy decoder 310, and specifically may determine an intra/inter prediction mode.

The predictor may generate a prediction signal based on various prediction methods. For example, the predictor may apply intra prediction or inter prediction for prediction on one block, and, as well, may apply intra prediction and inter prediction at the same time. This may be called combined inter and intra prediction (CIIP). In addition, the predictor may perform intra block copy (IBC) for prediction on a block. The intra block copy may be used for content image/video coding of a game or the like, such as screen content coding (SCC). Although the IBC basically performs prediction in a current block, it can be performed similarly to inter prediction in that it derives a reference block in a current block. That is, the IBC may use at least one of inter prediction techniques described in the present disclosure.

The intra predictor 331 may predict the current block by referring to the samples in the current picture. The referred samples may be located in the neighbor of or apart from the current block according to the prediction mode. In the intra prediction, prediction modes may include a plurality of non-directional modes and a plurality of directional modes. The intra predictor 331 may determine the prediction mode applied to the current block by using the prediction mode applied to the neighboring block.

The inter predictor 332 may derive a predicted block for the current block based on a reference block (reference sample array) specified by a motion vector on a reference picture. At this time, in order to reduce the amount of motion information transmitted in the inter prediction mode, the motion information may be predicted on a block, subblock, or sample basis based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block existing in the current picture and a temporal neighboring block existing in the reference picture. For example, the inter predictor 332 may configure a motion information candidate list based on neighboring blocks, and derive a motion vector and/or a reference picture index of the current block based on received candidate selection information. Inter prediction may be performed based on various prediction modes, and the information on prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, prediction sample array) output from the predictor 330. When there is no residual for a processing target block as in a case where the skip mode is applied, the predicted block may be used as a reconstructed block.

The adder 340 may be called a reconstructor or a reconstructed block generator. The generated reconstructed signal may be used for intra prediction of a next processing target block in the current block, and as described later, may be output through filtering or be used for inter prediction of a next picture.

Meanwhile, in the picture decoding process, luma mapping with chroma scaling (LMCS) may be applied.

The filter 350 may improve subjective/objective video quality by applying the filtering to the reconstructed signal. For example, the filter 350 may generate a modified reconstructed picture by applying various filtering methods to the reconstructed picture, and may transmit the modified reconstructed picture in the memory 360, specifically in the DPB of the memory 360. The various filtering methods may include, for example, deblocking filtering, sample adaptive offset, an adaptive loop filter, a bilateral filter or the like.

The (modified) reconstructed picture which has been stored in the DPB of the memory 360 may be used as a reference picture in the inter predictor 332. The memory 360 may store motion information of a block in the current picture, from which motion information has been derived (or decoded) and/or motion information of blocks in an already reconstructed picture. The stored motion information may be transmitted to the inter predictor 260 to be utilized as motion information of a neighboring block or motion information of a temporal neighboring block. The memory 360 may store reconstructed samples of reconstructed blocks in the current picture, and transmit them to the intra predictor 331.

In this specification, the examples described in the predictor 330, the dequantizer 321, the inverse transformer 322, and the filter 350 of the decoding apparatus 300 may be similarly or correspondingly applied to the predictor 220, the dequantizer 234, the inverse transformer 235, and the filter 260 of the encoding apparatus 200, respectively.

As described above, prediction is performed in order to increase compression efficiency in performing video coding. Through this, a predicted block including prediction samples for a current block, which is a coding target block, may be generated. Here, the predicted block includes prediction samples in a space domain (or pixel domain). The predicted block may be indentically derived in the encoding apparatus and the decoding apparatus, and the encoding apparatus may increase image coding efficiency by signaling to the decoding apparatus not original sample value of an original block itself but information on residual (residual information) between the original block and the predicted block. The decoding apparatus may derive a residual block including residual samples based on the residual information, generate a reconstructed block including reconstructed samples by adding the residual block to the predicted block, and generate a reconstructed picture including reconstructed blocks.

The residual information may be generated through transform and quantization procedures. For example, the encoding apparatus may derive a residual block between the original block and the predicted block, derive transform coefficients by performing a transform procedure on residual samples (residual sample array) included in the residual block, and derive quantized transform coefficients by performing a quantization procedure on the transform coefficients, so that it may signal associated residual information to the decoding apparatus (through a bitstream). Here, the residual information may include value information, position information, a transform technique, transform kernel, a quantization parameter or the like of the quantized transform coefficients. The decoding apparatus may perform a quantization/dequantization procedure and derive the residual samples (or residual sample block), based on residual information. The decoding apparatus may generate a reconstructed block based on a predicted block and the residual block. The encoding apparatus may derive a residual block by dequantizing/inverse transforming quantized transform coefficients for reference for inter prediction of a next picture, and may generate a reconstructed picture based on this.

Figure 4:
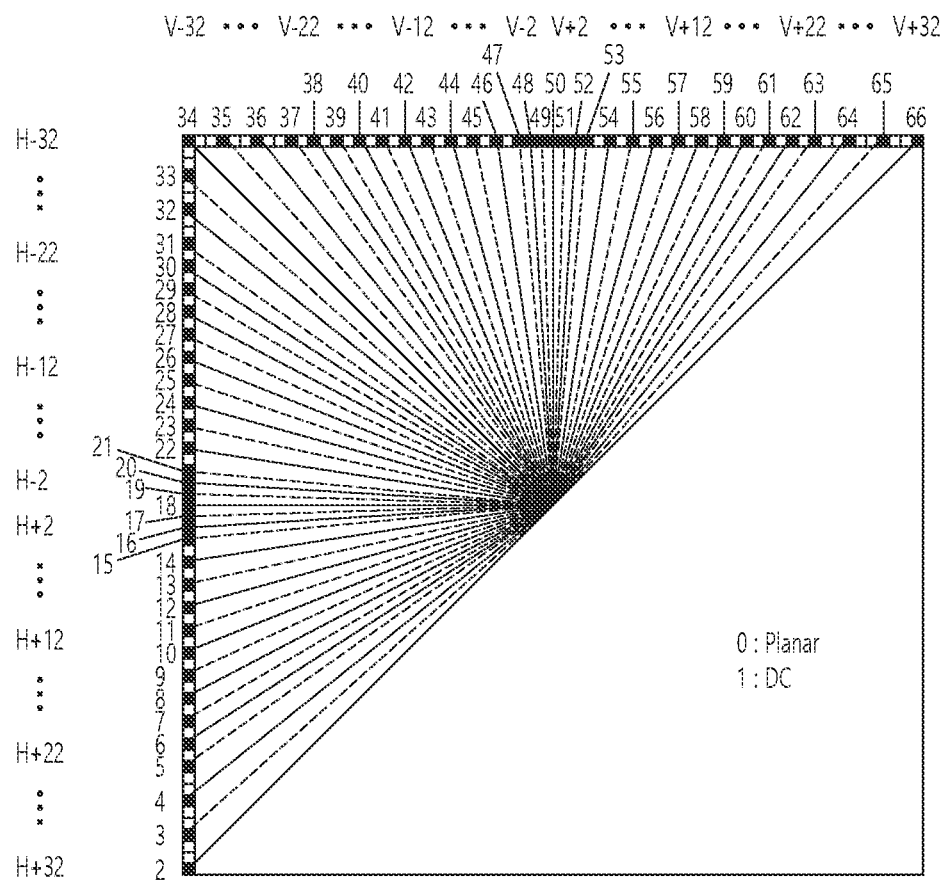
FIG. 4 exemplarily shows intra directional modes of 65 prediction directions.

FIG. 4 exemplarily shows intra directional modes of 65 prediction directions.

In intra prediction according to an embodiment of this document, 67 intra prediction modes may be used as shown in FIG. 4.

This is an extension of the existing 35 directional modes to 67 directional modes for intra-coding and more accurate prediction of high-resolution images. Arrows indicated by dotted lines in FIG. 4 indicate 32 directional modes newly added from 35 directional modes.

The intra planner (INTRA_PLANAR) mode and the intra DC (INTRA_DC) mode are the same as the existing intra planner mode and intra DC mode. The added 32 directional modes can be applied to all block sizes, and can be applied to both intra-encoding and decoding of a luminance (luma) component and a chroma (chroma) component.

Referring to FIG. 4, on the basis of intra prediction mode 34 having a left upward diagonal prediction direction, the intra prediction modes may be divided into intra prediction modes having horizontal directionality and intra prediction modes having vertical directionality. In FIG. 4, H and V denote horizontal directionality and vertical directionality, respectively, and numerals −32 to 32 indicate displacements in $\frac{1}{32}$ units on a sample grid position. These numerals may represent an offset for a mode index value. Intra prediction modes 2 to 33 have the horizontal directionality, and intra prediction modes 34 to 66 have the vertical directionality. Strictly speaking, intra prediction mode 34 may be considered as being neither horizontal nor vertical, but may be classified as belonging to the horizontal directionality in determining a transform set of a secondary transform. This is because input data is transposed to be used for a vertical direction mode symmetrical on the basis of intra prediction mode 34, and an input data alignment method for a horizontal mode is used for intra prediction mode 34. Transposing input data means that rows and columns of two-dimensional M×N block data are switched into N×M data. Intra prediction mode 18 and intra prediction mode 50 may represent a horizontal intra prediction mode and a vertical intra prediction mode, respectively, and intra prediction mode 2 may be referred to as a right upward diagonal intra prediction mode because intra prediction mode 2 has a left reference pixel and performs prediction in a right upward direction. Likewise, intra prediction mode 34 may be referred to as a right downward diagonal intra prediction mode, and intra prediction mode 66 may be referred to as a left downward diagonal intra prediction mode.

Figure 5:
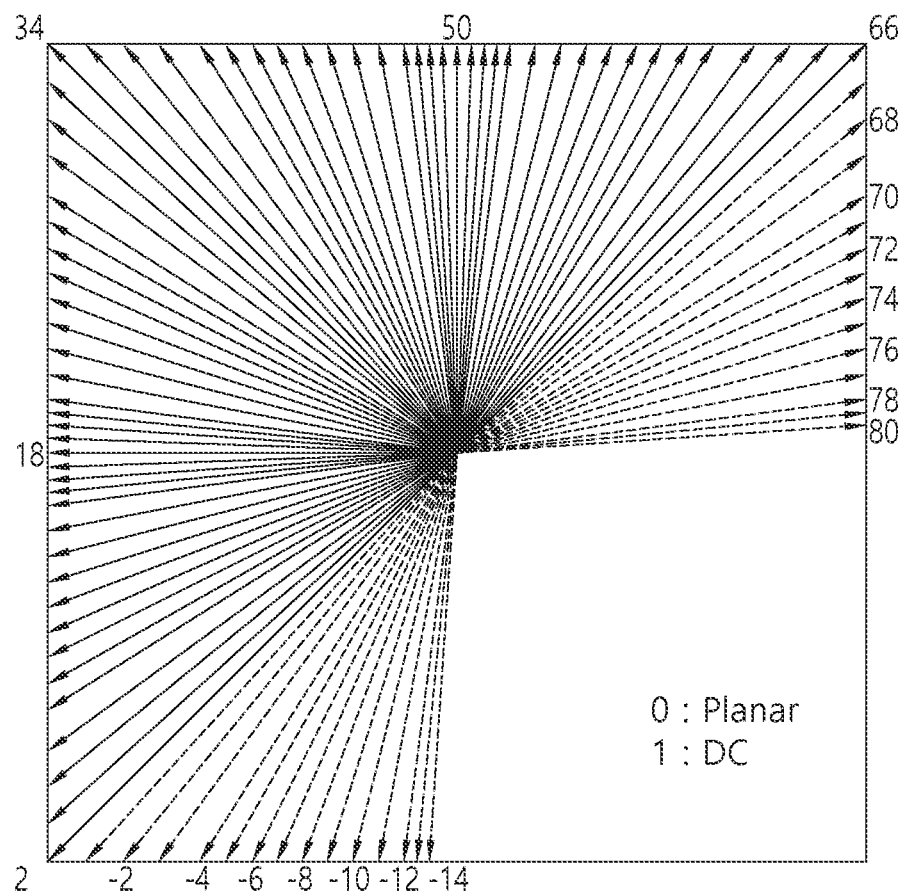
FIG. 5 is a diagram illustrating wide-angle intra prediction modes according to an embodiment of the present document.

FIG. 5 is a diagram illustrating wide-angle intra prediction modes according to an embodiment of the present document.

The general intra prediction mode value may have values from 0 to 66 and 81 to 83, and the intra prediction mode value extended due to WAIP may have a value from −14 to 83 as shown. Values from 81 to 83 indicate the CCLM (Cross Component Linear Model) mode, and values from −14 to −1 and values from 67 to 80 indicate the intra prediction mode extended due to the WAIP application.

When the width of the prediction current block is greater than the height, the upper reference pixels are generally closer to positions inside the block to be predicted. Therefore, it may be more accurate to predict in the bottom-left direction than in the top-right direction. Conversely, when the height of the block is greater than the width, the left reference pixels are generally close to positions inside the block to be predicted. Therefore, it may be more accurate to predict in the top-right direction than in the bottom-left direction. Therefore, it may be advantageous to apply remapping, ie, mode index modification, to the index of the wide-angle intra prediction mode.

When the wide-angle intra prediction is applied, information on the existing intra prediction may be signaled, and after the information is parsed, the information may be remapped to the index of the wide-angle intra prediction mode. Therefore, the total number of the intra prediction modes for a specific block (eg, a non-square block of a specific size) may not change, and that is, the total number of the intra prediction modes is 67, and intra prediction mode coding for the specific block may not be changed.

Table 1 below shows a process of deriving a modified intra mode by remapping the intra prediction mode to the wide-angle intra prediction mode.

TABLE 11

Inputs to this process are:
- a variable predModeIntra specifying the intra prediction mode,
- a variable nTbW specifying the transform block width,
- a variable nTbH specifying the transform block height,
- a variable cIdx specifying the colour component of the current block.
Output of this process is the modified intra prediction mode predModeIntra.
The variables nW and nH are derived as follows:
- If IntraSubPartitionsSplitType is equal to ISP_NO_SPLIT or cIdx is not equal to 0, the following applies:
    nW = nTbW    (8-97)
    nH = nTbH    (8-98)
- Otherwise ( IntraSubPartitionsSplitType is not equal to ISP_NO_SPLIT and cIdx is equal to 0 ), the following applies:
    nW = nCbW    (8-99)
    nH = nCbH    (8-100)
The variable whRatio is set equal to Abs( Log2( nW / nH ) ).
For non-square blocks (nW is not equal to nH), the intra prediction mode predModeIntra is modified as follows:
- If all of the following conditions are true, preModeIntra is set equal to ( predModeIntra + 65 ).
  - nW is greater than nH
  - predModeIntra is greater than or equal to 2
  - predModeIntra is less than ( wHRatio > 1) ? ( 8 + 2 * whRatio ) : 8
- Otherwise, if all of the following conditions are true, predModeIntra is set equal to ( predModeIntra − 67 ).
  - nH is greater than nW
  - predModeIntra is less than or equal to 66
  - predModeIntra is greater than ( whRatio > 1 ) ? ( 60 − 2 * whRatio ) : 60

In Table 1, the extended intra prediction mode value is finally stored in the predModeIntra variable, and ISP_NO_SPLIT indicates that the CU block is not divided into sub-partitions by the Intra Sub Partitions (ISP) technique currently adopted in the VVC standard, and the cIdx variable Values of 0, 1, and 2 indicate the case of luma, Cb, and Cr components, respectively. Log 2 function shown in Table 3 returns a log value with a base of 2, and the Abs function returns an absolute value.

Variable predModeIntra indicating the intra prediction mode and the height and width of the transform block, etc. are used as input values of the wide angle intra prediction mode mapping process, and the output value is the modified intra prediction mode predModeIntra. The height and width of the transform block or the coding block may be the height and width of the current block for remapping of the intra prediction mode. At this time, the variable whRatio reflecting the ratio of the width to the width may be set to Abs(Log 2(nW/nH)).

For a non-square block, the intra prediction mode may be divided into two cases and modified.

First, if all conditions (1)~(3) are satisfied, (1) the width of the current block is greater than the height, (2) the intra prediction mode before modifying is equal to or greater than 2, (3) the intra prediction mode is less than the value derived from (8+2*whRatio) when the variable whRatio is greater than 1, and is less than 8 when the variable whRatio is less than or equal to 1 [predModeIntra is less than (whRatio>1)? (8+2*whRatio): 8], the intra prediction mode is set to a value 65 greater than the intra prediction mode [predModeIntra is set equal to (predModeIntra+65)].

If different from the above, that is, follow conditions (1)~(3) are satisfied, (1) the height of the current block is greater than the width, (2) the intra prediction mode before modifying is less than or equal to 66, (3) the intra prediction mode is greater than the value derived from (60−2*whRatio) when the variable whRatio is greater than 1, and is greater than 60 when the variable whRatio is less than or equal to 1 [predModeIntra is greater than (whRatio>1)? (60−2*whRatio): 60], the intra prediction mode is set to a value 67 smaller than the intra prediction mode [predModeIntra is set equal to (predModeIntra−67)].

When intra prediction is performed on the current block, prediction of a luma component block (luma block) of the current block and prediction of a chroma component block (chroma block) thereof may be performed. In this case, an intra-prediction mode for a chroma component (chroma block) may be set separately from an intra-prediction mode for a luma component (luma block).

In the present specification, a "chroma block", a "chroma image", and the like may refer to the same meaning as a chrominance block, a chrominance image, and the like, and thus chroma and chrominance may be interchangeably used. Likewise, a "luma block", a "luma image", and the like may refer to the same meaning as a luminance block, a luminance image, and the like, and thus luma and luminance may be interchangeably used.

In this specification, a "current chroma block" may refer to a chroma component block of a current block that is a current coding unit, and a "current luma block" may refer to a luma component block of the current block that is the current coding unit. Therefore, the current luma block and the current chroma block correspond to each other. However, the current luma block and the current chroma block do not always have the same block shape and the same number of blocks, and may have different block shapes and different numbers of blocks depending on a case. In some cases, the current chroma block may correspond to a current luma region, in which case the current luma region may include at least one luma block.

The intra prediction mode for the chroma component may be indicated based on intra chroma prediction mode information, and the intra chroma prediction mode information may be signaled in the form of an intra_chroma_pred_mode syntax element. For example, the intra chroma prediction mode information may indicate one of a planar mode, a DC mode, a vertical mode, a horizontal mode, a derived mode (DM), and a CCLM mode. Here, when the 67 intra prediction modes illustrated in FIG. 4 are used, the planar mode may indicate intra prediction mode 0, the DC mode may indicate intra prediction model, the vertical mode may indicate intra prediction mode 50, and the horizontal mode may indicate intra prediction mode 18. The DM may also be referred to as a direct mode. The CCLM may be referred to as an LM.

The DM and the CCLM are dependent intra prediction modes for predicting a chroma block using information on a luma block. The DM may refer to a mode in which the same intra prediction mode as the intra prediction mode for the luma component is applied as the intra prediction mode for the chroma component. The CCLM may refer to an intra prediction mode in which reconstructed samples of the luma block are subsampled in a process of generating a prediction block for the chroma block, and then samples derived by applying CCLM parameters $\alpha$ and $\beta$ to the subsampled samples are used as prediction samples for the chroma block.

Figure 6:
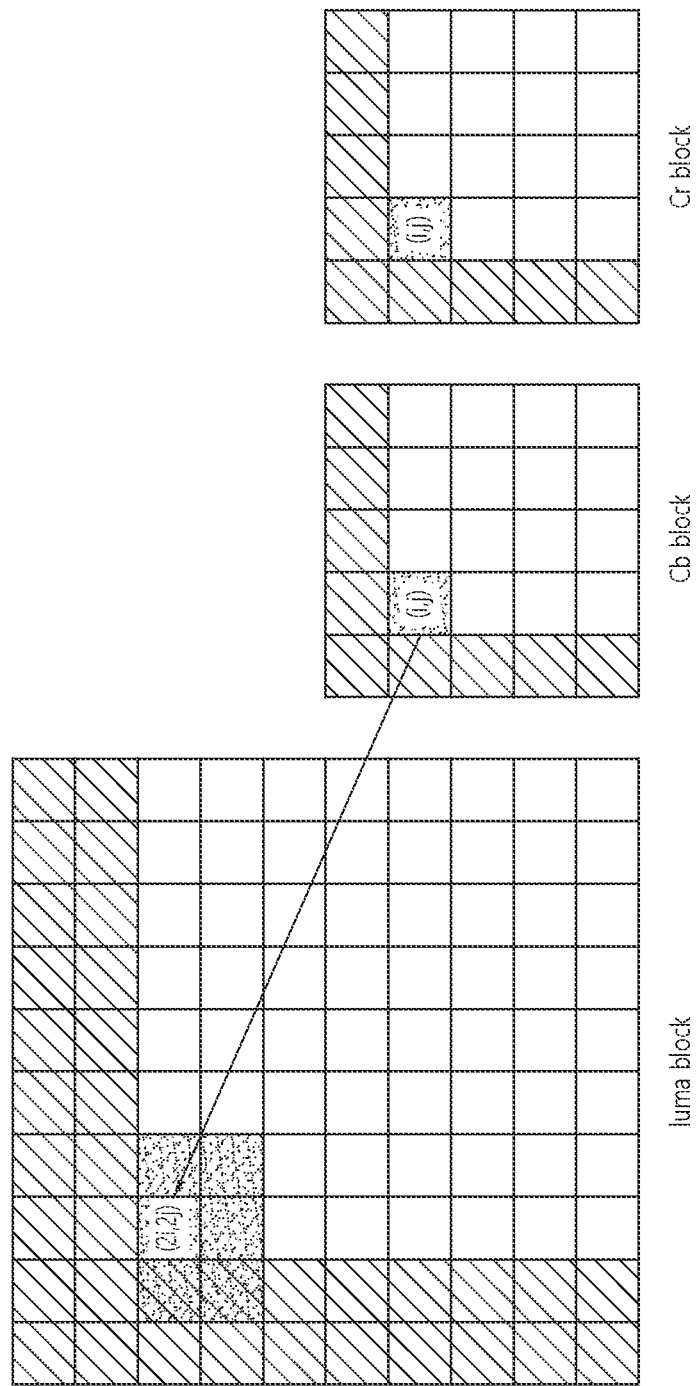
FIG. 6 is a diagram for describing CCLM that can be applied when deriving an intra prediction mode of a chroma block according to an embodiment.

FIG. 6 is a diagram illustrating a CCLM that is applicable when deriving an intra prediction mode for a chroma block according to an embodiment.

In the present specification, a "reference sample template" may refer to a set of neighboring reference samples of a current chroma block for predicting the current chroma block. The reference sample template may be predefined, and information on the reference sample template may be signaled from the encoding apparatus 200 to the decoding apparatus 300.

Referring to FIG. 6, a set of samples shaded in one line around a 4×4 block that is a current chroma block indicates a reference sample template. It is shown in FIG. 8 that the reference sample template is configured in one line of reference samples, while a reference sample region in a luma region corresponding to the reference sample template is configured in two lines.

In an embodiment, when intra encoding of a chroma image is performed in a joint exploration test model (JEM) used in the Joint Video Exploration Team (JVET), a cross component linear model (CCLM) may be used. The CCLM is a method for predicting a pixel value of a chroma image from a pixel value of a reconstructed luminance image, and is based on a characteristic of a high correlation between a luminance image and a chroma image.

CCLM prediction of Cb and Cr chroma images may be based on the following equation.

$$\text{Pred}_c(i,j) = \alpha \cdot Rec'_L(i,j) + \beta \quad \text{[Equation 1]}$$

Here, $\text{pred}_C (i, j)$ denotes a Cb or Cr chroma image to be predicted, $Rec_L'(i, j)$ denotes a reconstructed luminance image adjusted to a chroma block size, and (i, j) denotes the coordinates of a pixel. In a 4:2:0 color format, since the size of a luminance image is twice that of a chroma image, $Rec_L'$ with the chroma block size needs to be generated through downsampling, and therefore the chroma image predc (i,j), pixels of the luminance image to be used for the chroma image $\text{pred}_c$ (i, j) may be employed considering both $Rec_L$ (2i, 2j) and neighboring pixels. $Rec_L'(i,j)$ may be referred to as a down-sampled luma sample.

For example, $Rec_L'(i,j)$ may be derived using six neighboring pixels as shown in the following equation.

$$Rec'_L(x,y)=(2 \times Rec_L(2x,2y)+2 \times Rec_L(2x,2y+1)+Rec_L(2x-1,2y)+Rec_L(2x+1,2y)+Rec_L(2x-1,2y+1)+Rec_L(2x+1,2y+1)+4)>>3 \quad \text{[Equation 2]}$$

$\alpha$ and $\beta$ denote a cross-correlation and an average difference between a neighboring template of the Cb or Cr chroma block and a neighboring template of the luminance block in the shaded region in FIG. 8. For example, $\alpha$ and $\beta$ are represented by Equation 3.

$$\alpha = \frac{N \cdot \sum (L(n) \cdot C(n)) - \sum L(n) \cdot \sum C(n)}{N \cdot \sum (L(n) \cdot L(n)) - \sum L(n) \cdot \sum L(n)} \quad \text{[Equation 3]}$$

$$\beta = \frac{\sum C(n) - \alpha \cdot \sum L(n)}{N}$$

Here, L(n) denotes neighboring reference samples and/or left neighboring samples of a luma block corresponding to a current chroma image, C(n) denotes neighboring reference samples and/or left neighboring samples of the current chroma block to which encoding is currently applied, and (i, j) denotes a pixel position. In addition, L(n) may denote down-sampled upper neighboring samples and/or left neighboring samples of the current luma block. N may denote the total number of pixel pair (luminance and chroma) values used for calculation of a CCLM parameter, and may indicate a value that is twice a smaller value of the width and the height of the current chroma block.

Meanwhile, pictures may be divided into a sequence of coding tree units (CTUs). A CTU may correspond to a coding tree block (CTB). Alternatively, the CTU may include a coding tree block of luma samples and two coding tree blocks of corresponding chroma samples. A tree type may be classified as a single tree (SINGLE_TREE) or a dual tree (DUAL_TREE) according to whether a luma block and a corresponding chroma block have an individual partition structure. A single tree may indicate that the chroma block has the same partition structure as the luma block, and a dual tree may indicate that the chroma component block has a partition structure different from that of the luma block.

Hereinafter, a transform process entailing an image coding or decoding process of the present disclosure will be described.

Figure 7:
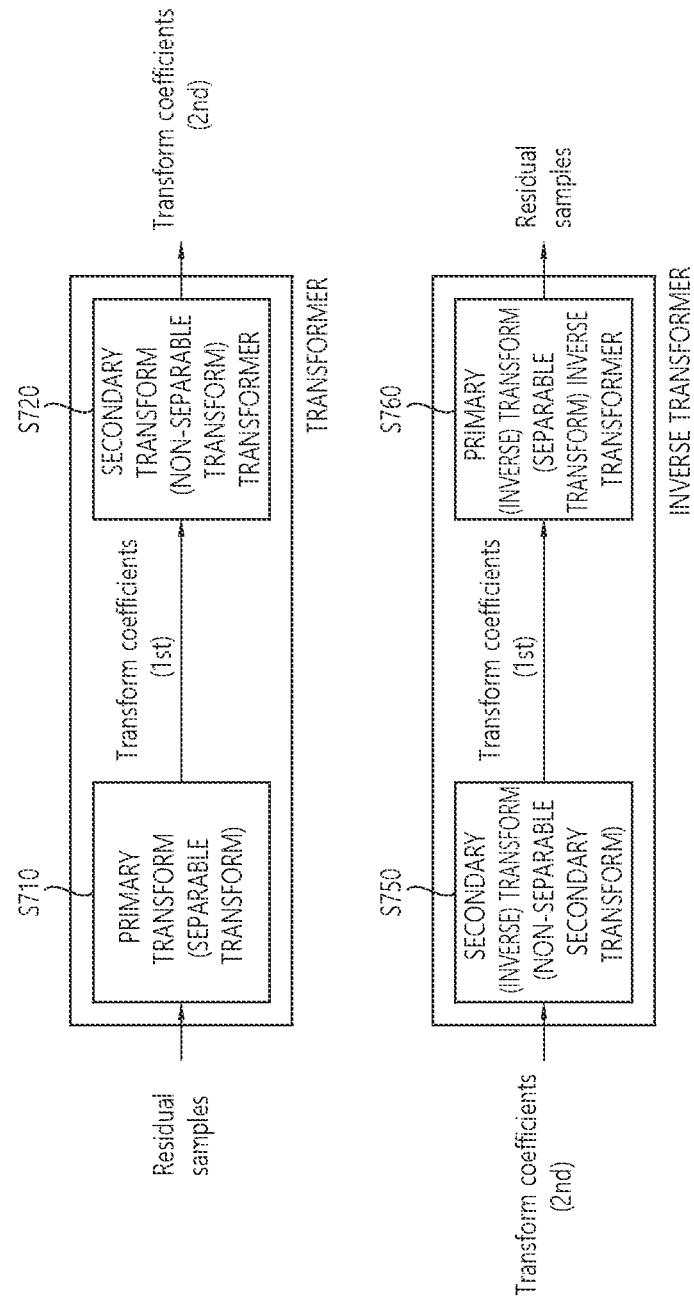
FIG. 7 is schematically illustrates a multiple transform scheme according to an embodiment of the present document.

FIG. 7 schematically illustrates a multiple transform technique according to an embodiment of the present disclosure.

Referring to FIG. 7, a transformer may correspond to the transformer in the encoding apparatus of foregoing FIG. 2, and an inverse transformer may correspond to the inverse transformer in the encoding apparatus of foregoing FIG. 2, or to the inverse transformer in the decoding apparatus of FIG. 3.

The transformer may derive (primary) transform coefficients by performing a primary transform based on residual samples (residual sample array) in a residual block (S710). This primary transform may be referred to as a core transform. Herein, the primary transform may be based on multiple transform selection (MTS), and when a multiple transform is applied as the primary transform, it may be referred to as a multiple core transform.

The multiple core transform may represent a method of transforming additionally using discrete cosine transform (DCT) type 2 and discrete sine transform (DST) type 7, DCT type 8, and/or DST type 1. That is, the multiple core transform may represent a transform method of transforming a residual signal (or residual block) of a space domain into transform coefficients (or primary transform coefficients) of a frequency domain based on a plurality of transform kernels selected from among the DCT type 2, the DST type 7, the DCT type 8 and the DST type 1. Herein, the primary transform coefficients may be called temporary transform coefficients from the viewpoint of the transformer.

In other words, when the conventional transform method is applied, transform coefficients might be generated by applying transform from a space domain to a frequency domain for a residual signal (or residual block) based on the DCT type 2. Unlike to this, when the multiple core transform is applied, transform coefficients (or primary transform coefficients) may be generated by applying transform from a space domain to a frequency domain for a residual signal (or residual block) based on the DCT type 2, the DST type 7, the DCT type 8, and/or DST type 1. Herein, the DCT type 2, the DST type 7, the DCT type 8, and the DST type 1 may be called a transform type, transform kernel or transform core. These DCT/DST transform types can be defined based on basis functions.

When the multiple core transform is performed, a vertical transform kernel and a horizontal transform kernel for a target block may be selected from among the transform kernels, a vertical transform may be performed on the target block based on the vertical transform kernel, and a horizontal transform may be performed on the target block based on the horizontal transform kernel. Here, the horizontal transform may indicate a transform on horizontal components of the target block, and the vertical transform may indicate a transform on vertical components of the target block. The vertical transform kernel/horizontal transform kernel may be adaptively determined based on a prediction mode and/or a transform index for the target block (CU or subblock) including a residual block.

Further, according to an example, if the primary transform is performed by applying the MTS, a mapping relationship for transform kernels may be set by setting specific basis functions to predetermined values and combining basis functions to be applied in the vertical transform or the horizontal transform. For example, when the horizontal transform kernel is expressed as trTypeHor and the vertical direction transform kernel is expressed as trTypeVer, a trTypeHor or trTypeVer value of 0 may be set to DCT2, a trTypeHor or trTypeVer value of 1 may be set to DST7, and a trTypeHor or trTypeVer value of 2 may be set to DCT8.

In this case, MTS index information may be encoded and signaled to the decoding apparatus to indicate any one of a plurality of transform kernel sets. For example, an MTS index of 0 may indicate that both trTypeHor and trTypeVer values are 0, an MTS index of 1 may indicate that both trTypeHor and trTypeVer values are 1, an MTS index of 2 may indicate that the trTypeHor value is 2 and the trTypeVer value. Is 1, an MTS index of 3 may indicate that the trTypeHor value is 1 and the trTypeVer value is 2, and an MTS index of 4 may indicate that both both trTypeHor and trTypeVer values are 2.

In one example, transform kernel sets according to MTS index information are illustrated in the following table.

TABLE 2

| tu_mts_idx[ x0 ][ y0 ] | 0 | 1 | 2 | 3 | 4 |
|---|---|---|---|---|---|
| trTypeHor | 0 | 1 | 2 | 1 | 2 |
| trTypeVer | 0 | 1 | 1 | 2 | 2 |

The transformer may derive modified (secondary) transform coefficients by performing the secondary transform based on the (primary) transform coefficients (S720). The primary transform is a transform from a spatial domain to a frequency domain, and the secondary transform refers to transforming into a more compressive expression by using a correlation existing between (primary) transform coefficients. The secondary transform may include a non-separable transform. In this case, the secondary transform may be called a non-separable secondary transform (NSST), or a mode-dependent non-separable secondary transform (MDNSST). The non-separable secondary transform may represent a transform which generates modified transform coefficients (or secondary transform coefficients) for a residual signal by secondary-transforming, based on a non-separable transform matrix, (primary) transform coefficients derived through the primary transform. At this time, the vertical transform and the horizontal transform may not be applied separately (or horizontal and vertical transforms may not be applied independently) to the (primary) transform coefficients, but the transforms may be applied at once based on the non-separable transform matrix. In other words, the non-separable secondary transform may represent a transform method in which the vertical and horizontal components of the (primary) transform coefficients are not separated, and for example, two-dimensional signals (transform coefficients) are rearranged to a one-dimensional signal through a certain determined direction (e.g., row-first direction or column-first direction), and then modified transform coefficients (or secondary transform coefficients) are generated based on the non-separable transform matrix. For example, according to a row-first order, M×N blocks are disposed in a line in an order of a first row, a second row, . . . , and an Nth row. According to a column-first order, M×N blocks are disposed in a line in an order of a first column, a second column, . . . , and an Nth column. The non-separable secondary transform may be applied to a top-left region of a block configured with (primary) transform coefficients (hereinafter, may be referred to as a transform coefficient block). For example, if the width (W) and the height (H) of the transform coefficient block are all equal to or greater than 8, an 8×8 non-separable secondary transform may be applied to a top-left 8×8 region of the transform coefficient block. Further, if the width (W) and the height (H) of the transform coefficient block are all equal to or greater than 4, and the width (W) or the height (H) of the transform coefficient block is less than 8, then a 4×4 non-separable secondary transform may be applied to a top-left min(8,W)×min(8,H) region of the transform coefficient block. However, the embodiment is not limited to this, and for example, even if only the condition that the width (W) or height (H) of the transform coefficient block is equal to or greater than 4 is satisfied, the 4×4 non-separable secondary transform may be applied to the top-left min(8,W)×min(8,H) region of the transform coefficient block.

Specifically, for example, if a 4×4 input block is used, the non-separable secondary transform may be performed as follows.

The 4×4 input block X may be represented as follows.

$$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix}$$ [Equation 4]

If the X is represented in the form of a vector, the vector $\vec{X}$ may be represented as below.

$$\vec{X} = [X_{00}, X_{01}, X_{02}, X_{03}, X_{10}, X_{11}, X_{12}, X_{13}, X_{20}, X_{21}, X_{22}, X_{23}, X_{30}, X_{31}, X_{32}, X_{33}]^T \quad \text{[Equation 5]}$$

In Equation 5, the vector $\vec{X}$ is a one-dimensional vector obtained by rearranging the two-dimensional block X of Equation 1 according to the row-first order.

In this case, the secondary non-separable transform may be calculated as below.

$$\vec{F} = T \cdot \vec{X} \quad \text{[Equation 6]}$$

In this equation, $\vec{F}$ represents a transform coefficient vector, and T represents a 16×16 (non-separable) transform matrix.

Through foregoing Equation 6, a 16×1 transform coefficient vector $\vec{F}$ may be derived, and the $\vec{F}$ may be re-organized into a 4×4 block through a scan order (horizontal, vertical, diagonal and the like). However, the above-described calculation is an example, and hypercube-Givens transform (HyGT) or the like may be used for the calculation of the non-separable secondary transform in order to reduce the computational complexity of the non-separable secondary transform.

Meanwhile, in the non-separable secondary transform, a transform kernel (or transform core, transform type) may be selected to be mode dependent. In this case, the mode may include the intra prediction mode and/or the inter prediction mode.

As described above, the non-separable secondary transform may be performed based on an 8×8 transform or a 4×4 transform determined based on the width (W) and the height (H) of the transform coefficient block. The 8×8 transform refers to a transform that is applicable to an 8×8 region included in the transform coefficient block when both W and H are equal to or greater than 8, and the 8×8 region may be a top-left 8×8 region in the transform coefficient block. Similarly, the 4×4 transform refers to a transform that is applicable to a 4×4 region included in the transform coefficient block when both W and H are equal to or greater than 4, and the 4×4 region may be a top-left 4×4 region in the transform coefficient block. For example, an 8×8 transform kernel matrix may be a 64×64/16×64 matrix, and a 4×4 transform kernel matrix may be a 16×16/8×16 matrix.

Here, to select a mode-dependent transform kernel, two non-separable secondary transform kernels per transform set for a non-separable secondary transform may be configured for both the 8×8 transform and the 4×4 transform, and there may be four transform sets. That is, four transform sets may be configured for the 8×8 transform, and four transform sets may be configured for the 4×4 transform. In this case, each of the four transform sets for the 8×8 transform may include two 8×8 transform kernels, and each of the four transform sets for the 4×4 transform may include two 4×4 transform kernels.

However, as the size of the transform, that is, the size of a region to which the transform is applied, may be, for example, a size other than 8×8 or 4×4, the number of sets may be n, and the number of transform kernels in each set may be k.

The transform set may be referred to as an NSST set or an LFNST set. A specific set among the transform sets may be selected, for example, based on the intra prediction mode of the current block (CU or subblock). A low-frequency non-separable transform (LFNST) may be an example of a reduced non-separable transform, which will be described later, and represents a non-separable transform for a low frequency component.

For reference, for example, the intra prediction mode may include two non-directional (or non-angular) intra prediction modes and 65 directional (or angular) intra prediction modes. The non-directional intra prediction modes may include a planar intra prediction mode of No. 0 and a DC intra prediction mode of No. 1, and the directional intra prediction modes may include 65 intra prediction modes of Nos. 2 to 66. However, this is an example, and this document may be applied even when the number of intra prediction modes is different. Meanwhile, in some cases, intra prediction mode No. 67 may be further used, and the intra prediction mode No. 67 may represent a linear model (LM) mode.

According to an example, the four transform sets according to the intra prediction mode of FIGS. 4 and 5 may be mapped, for example, as shown in the following table.

TABLE 3

| lfnstPredModeIntra | lfnstTrSetIdx |
| --- | --- |
| lfnstPredModeIntra < 0 | 1 |
| 0 <= lfnstPredModeIntra <= 1 | 0 |
| 2 <= lfnstPredModeIntra <= 12 | 1 |
| 13 <= lfnstPredModeIntra <= 23 | 2 |
| 24 <= lfnstPredModeIntra <= 44 | 3 |
| 45 <= lfnstPredModeIntra <= 55 | 2 |
| 56 <= lfnstPredModeIntra <= 80 | 1 |
| 81 <= lfnstPredModeIntra <= 83 | 0 |

As shown in Table 3, any one of the four transform sets, that is, lfnstTrSetIdx, may be mapped to any one of four indexes, that is, 0 to 3, according to the intra prediction mode.

When it is determined that a specific set is used for the non-separable transform, one of k transform kernels in the specific set may be selected through a non-separable secondary transform index. An encoding apparatus may derive a non-separable secondary transform index indicating a specific transform kernel based on a rate-distortion (RD) check and may signal the non-separable secondary transform index to a decoding apparatus. The decoding apparatus may select one of the k transform kernels in the specific set based on the non-separable secondary transform index. For example, lfnst index value 0 may refer to a first non-separable secondary transform kernel, lfnst index value 1 may refer to a second non-separable secondary transform kernel, and lfnst index value 2 may refer to a third non-separable secondary transform kernel. Alternatively, lfnst index value 0 may indicate that the first non-separable secondary transform is not applied to the target block, and lfnst index values 1 to 3 may indicate the three transform kernels.

The transformer may perform the non-separable secondary transform based on the selected transform kernels, and may obtain modified (secondary) transform coefficients. As described above, the modified transform coefficients may be derived as transform coefficients quantized through the quantizer, and may be encoded and signaled to the decoding apparatus and transferred to the dequantizer/inverse transformer in the encoding apparatus.

Meanwhile, as described above, if the secondary transform is omitted, (primary) transform coefficients, which are an output of the primary (separable) transform, may be derived as transform coefficients quantized through the quantizer as described above, and may be encoded and signaled to the decoding apparatus and transferred to the dequantizer/inverse transformer in the encoding apparatus.

The inverse transformer may perform a series of procedures in the inverse order to that in which they have been performed in the above-described transformer. The inverse transformer may receive (dequantized) transformer coefficients, and derive (primary) transform coefficients by performing a secondary (inverse) transform (S750), and may obtain a residual block (residual samples) by performing a primary (inverse) transform on the (primary) transform coefficients (S760). In this connection, the primary transform coefficients may be called modified transform coefficients from the viewpoint of the inverse transformer. As described above, the encoding apparatus and the decoding apparatus may generate the reconstructed block based on the residual block and the predicted block, and may generate the reconstructed picture based on the reconstructed block.

The decoding apparatus may further include a secondary inverse transform application determinator (or an element to determine whether to apply a secondary inverse transform) and a secondary inverse transform determinator (or an element to determine a secondary inverse transform). The secondary inverse transform application determinator may determine whether to apply a secondary inverse transform. For example, the secondary inverse transform may be an NSST, an RST, or an LFNST and the secondary inverse transform application determinator may determine whether to apply the secondary inverse transform based on a secondary transform flag obtained by parsing the bitstream. In another example, the secondary inverse transform application determinator may determine whether to apply the secondary inverse transform based on a transform coefficient of a residual block.

The secondary inverse transform determinator may determine a secondary inverse transform. In this case, the secondary inverse transform determinator may determine the secondary inverse transform applied to the current block based on an LFNST (NSST or RST) transform set specified according to an intra prediction mode. In an embodiment, a secondary transform determination method may be determined depending on a primary transform determination method. Various combinations of primary transforms and secondary transforms may be determined according to the intra prediction mode. Further, in an example, the secondary inverse transform determinator may determine a region to which a secondary inverse transform is applied based on the size of the current block.

Meanwhile, as described above, if the secondary (inverse) transform is omitted, (dequantized) transform coefficients may be received, the primary (separable) inverse transform may be performed, and the residual block (residual samples) may be obtained. As described above, the encoding apparatus and the decoding apparatus may generate the reconstructed block based on the residual block and the predicted block, and may generate the reconstructed picture based on the reconstructed block.

Meanwhile, in the present disclosure, a reduced secondary transform (RST) in which the size of a transform matrix (kernel) is reduced may be applied in the concept of NSST in order to reduce the amount of computation and memory required for the non-separable secondary transform.

Meanwhile, the transform kernel, the transform matrix, and the coefficient constituting the transform kernel matrix, that is, the kernel coefficient or the matrix coefficient, described in the present disclosure may be expressed in 8 bits. This may be a condition for implementation in the decoding apparatus and the encoding apparatus, and may reduce the amount of memory required to store the transform kernel with a performance degradation that can be reasonably accommodated compared to the existing 9 bits or 10 bits. In addition, the expressing of the kernel matrix in 8 bits may allow a small multiplier to be used, and may be more suitable for single instruction multiple data (SIMD) instructions used for optimal software implementation.

In the present specification, the term "RST" may mean a transform which is performed on residual samples for a target block based on a transform matrix whose size is reduced according to a reduced factor. In the case of performing the reduced transform, the amount of computation required for transform may be reduced due to a reduction in the size of the transform matrix. That is, the RST may be used to address the computational complexity issue occurring at the non-separable transform or the transform of a block of a great size.

RST may be referred to as various terms, such as reduced transform, reduced secondary transform, reduction transform, simplified transform, simple transform, and the like, and the name which RST may be referred to as is not limited to the listed examples. Alternatively, ince the RST is mainly performed in a low frequency region including a non-zero coefficient in a transform block, it may be referred to as a Low-Frequency Non-Separable Transform (LFNST). The transform index may be referred to as an LFNST index.

Meanwhile, when the secondary inverse transform is performed based on RST, the inverse transformer 235 of the encoding apparatus 200 and the inverse transformer 322 of the decoding apparatus 300 may include an inverse reduced secondary transformer which derives modified transform coefficients based on the inverse RST of the transform coefficients, and an inverse primary transformer which derives residual samples for the target block based on the inverse primary transform of the modified transform coefficients. The inverse primary transform refers to the inverse transform of the primary transform applied to the residual. In the present disclosure, deriving a transform coefficient based on a transform may refer to deriving a transform coefficient by applying the transform.

FIG. 8 is a diagram illustrating an RST according to an embodiment of the present disclosure.

In the present disclosure, a "target block" may refer to a current block to be coded, a residual block, or a transform block.

In the RST according to an example, an N-dimensional vector may be mapped to an R-dimensional vector located in another space, so that the reduced transform matrix may be determined, where R is less than N. N may mean the square of the length of a side of a block to which the transform is applied, or the total number of transform coefficients corresponding to a block to which the transform is applied, and the reduced factor may mean an R/N value. The reduced factor may be referred to as a reduced factor, reduction factor, simplified factor, simple factor or other various terms. Meanwhile, R may be referred to as a reduced coefficient, but according to circumstances, the reduced factor may mean R. Further, according to circumstances, the reduced factor may mean the N/R value.

In an example, the reduced factor or the reduced coefficient may be signaled through a bitstream, but the example is not limited to this. For example, a predefined value for the reduced factor or the reduced coefficient may be stored in each of the encoding apparatus 200 and the decoding apparatus 300, and in this case, the reduced factor or the reduced coefficient may not be signaled separately.

The size of the reduced transform matrix according to an example may be R×N less than N×N, the size of a conventional transform matrix, and may be defined as in Equation 7 below.

$$T_{R \times N} = \begin{bmatrix} t_{11} & t_{12} & t_{13} & \cdots & t_{1N} \\ t_{21} & t_{22} & t_{23} & & t_{2N} \\ \vdots & & & \ddots & \vdots \\ t_{R1} & t_{R2} & t_{R3} & \cdots & t_{RN} \end{bmatrix} \quad \text{[Equation 7]}$$

The matrix T in the Reduced Transform block shown in FIG. 8(a) may mean the matrix $T_{R \times N}$ of Equation 7. As shown in FIG. 8(a), when the reduced transform matrix $T_{R \times N}$ is multiplied to residual samples for the target block, transform coefficients for the target block may be derived.

In an example, if the size of the block to which the transform is applied is 8×8 and R=16 (i.e., R/N=16/64=¼), then the RST according to FIG. 8(a) may be expressed as a matrix operation as shown in Equation 8 below. In this case, memory and multiplication calculation can be reduced to approximately ¼ by the reduced factor.

In the present disclosure, a matrix operation may be understood as an operation of multiplying a column vector by a matrix, disposed on the left of the column vector, to obtain a column vector.

$$\begin{bmatrix} t_{1,1} & t_{1,2} & t_{1,3} & \cdots & t_{1,64} \\ t_{2,1} & t_{2,2} & t_{2,3} & & t_{2,64} \\ \vdots & & & \ddots & \vdots \\ t_{16,1} & t_{16,2} & t_{16,3} & \cdots & t_{16,64} \end{bmatrix} \times \begin{bmatrix} r_1 \\ r_2 \\ \vdots \\ r_{64} \end{bmatrix} \quad \text{[Equation 8]}$$

In Equation 8, $r_1$ to $r_{64}$ may represent residual samples for the target block and may be specifically transform coefficients generated by applying a primary transform. As a result of the calculation of Equation 8 transform coefficients ci for the target block may be derived, and a process of deriving ci may be as in Equation 9.

```
for i from to R:
    c_i = 0
    for j from 1 to N
        c_i += t_ij * r_j
```
[Equation 9]

As a result of the calculation of Equation 9, transform coefficients $c_1$ to $c_R$ for the target block may be derived. That is, when R=16, transform coefficients $c_1$ to $c_1$ for the target block may be derived. If, instead of RST, a regular transform is applied and a transform matrix of 64×64 (N×N) size is multiplied to residual samples of 64×1 (N×1) size, then only 16 (R) transform coefficients are derived for the target block because RST was applied, although 64 (N) transform coefficients are derived for the target block. Since the total number of transform coefficients for the target block is reduced from N to R, the amount of data transmitted by the encoding apparatus 200 to the decoding apparatus 300 decreases, so efficiency of transmission between the encoding apparatus 200 and the decoding apparatus 300 can be improved.

When considered from the viewpoint of the size of the transform matrix, the size of the regular transform matrix is 64×64 (N×N), but the size of the reduced transform matrix is reduced to 16×64 (R×N), so memory usage in a case of performing the RST can be reduced by an R/N ratio when compared with a case of performing the regular transform. In addition, when compared to the number of multiplication calculations N×N in a case of using the regular transform matrix, the use of the reduced transform matrix can reduce the number of multiplication calculations by the R/N ratio (R×N).

In an example, the transformer 232 of the encoding apparatus 200 may derive transform coefficients for the target block by performing the primary transform and the RST-based secondary transform on residual samples for the target block. These transform coefficients may be transferred to the inverse transformer of the decoding apparatus 300, and the inverse transformer 322 of the decoding apparatus 300 may derive the modified transform coefficients based on the inverse reduced secondary transform (RST) for the transform coefficients, and may derive residual samples for the target block based on the inverse primary transform for the modified transform coefficients.

The size of the inverse RST matrix $T_{N \times R}$ according to an example is N×R less than the size N×N of the regular inverse transform matrix, and is in a transpose relationship with the reduced transform matrix $T_{R \times N}$ shown in Equation 7.

The matrix $T^t$ in the Reduced Inv. Transform block shown in FIG. 8(b) may mean the inverse RST matrix $T_{R \times N}^T$ (the superscript T means transpose). When the inverse RST matrix $T_{R \times N}^T$ is multiplied to the transform coefficients for the target block as shown in FIG. 8(b), the modified transform coefficients for the target block or the residual samples for the current block may be derived. The inverse RST matrix $T_{R \times N}^T$ may be expressed as $(T_{R \times N}^T)_{N \times R}$.

More specifically, when the inverse RST is applied as the secondary inverse transform, the modified transform coefficients for the target block may be derived when the inverse RST matrix $T_{R \times N}^T$ is multiplied to the transform coefficients for the target block. Meanwhile, the inverse RST may be applied as the inverse primary transform, and in this case, the residual samples for the target block may be derived when the inverse RST matrix $T_{R \times N}^T$ is multiplied to the transform coefficients for the target block.

In an example, if the size of the block to which the inverse transform is applied is 8×8 and R=16 (i.e., R/N=16/64=¼), then the RST according to FIG. 8(b) may be expressed as a matrix operation as shown in Equation 10 below.

$$\begin{bmatrix} t_{1,1} & t_{2,1} & & t_{16,1} \\ t_{1,2} & t_{2,2} & & t_{16,2} \\ t_{1,3} & t_{2,3} & \cdots & t_{16,3} \\ \vdots & \vdots & & \vdots \\ \vdots & \vdots & \ddots & \vdots \\ t_{1,64} & t_{2,64} & \cdots & t_{16,64} \end{bmatrix} \times \begin{bmatrix} c_1 \\ c_2 \\ \vdots \\ c_{16} \end{bmatrix} \quad \text{[Equation 10]}$$

In Equation 10, $c_1$ to $c_1$ may represent the transform coefficients for the target block. As a result of the calculation of Equation 10, $r_i$ representing the modified transform coefficients for the target block or the residual samples for the target block may be derived, and the process of deriving $r_i$ may be as in Equation 11.

```
For i from 1 to N
    r_i = 0
    for j from 1 to R
        r_i += t_ji * c_j
```
[Equation 11]

As a result of the calculation of Equation 11, $r_1$ to $r_N$ representing the modified transform coefficients for the target block or the residual samples for the target block may be derived. When considered from the viewpoint of the size of the inverse transform matrix, the size of the regular inverse transform matrix is 64×64 (N×N), but the size of the reduced inverse transform matrix is reduced to 64×16 (R×N), so memory usage in a case of performing the inverse RST can be reduced by an R/N ratio when compared with a case of performing the regular inverse transform. In addition, when compared to the number of multiplication calculations N×N in a case of using the regular inverse transform matrix, the use of the reduced inverse transform matrix can reduce the number of multiplication calculations by the R/N ratio (N×R).

A transform set configuration shown in Table 3 may also be applied to an 8×8 RST. That is, the 8×8 RST may be applied according to a transform set in Table 3. Since one transform set includes two or three transforms (kernels) according to an intra prediction mode, it may be configured to select one of up to four transforms including that in a case where no secondary transform is applied. In a transform where no secondary transform is applied, it may be considered to apply an identity matrix. Assuming that indexes 0, 1, 2, and 3 are respectively assigned to the four transforms (e.g., index 0 may be allocated to a case where an identity matrix is applied, that is, a case where no secondary transform is applied), a transform index or an lfnst index as a syntax element may be signaled for each transform coefficient block, thereby designating a transform to be applied. That is, for a top-left 8×8 block, through the transform index, it is possible to designate an 8×8 RST in an RST configuration, or to designate an 8×8 lfnst when the LFNST is applied. The 8×8 lfnst and the 8×8 RST refer to transforms applicable to an 8×8 region included in the transform coefficient block when both W and H of the target block to be transformed are equal to or greater than 8, and the 8×8 region may be a top-left 8×8 region in the transform coefficient block. Similarly, a 4×4 lfnst and a 4×4 RST refer to transforms applicable to a 4×4 region included in the transform coefficient block when both W and H of the target block to are equal to or greater than 4, and the 4×4 region may be a top-left 4×4 region in the transform coefficient block.

According to an embodiment of the present disclosure, for a transform in an encoding process, only 48 pieces of data may be selected and a maximum 16×48 transform kernel matrix may be applied thereto, rather than applying a 16×64 transform kernel matrix to 64 pieces of data forming an 8×8 region. Here, "maximum" means that m has a maximum value of 16 in an m×48 transform kernel matrix for generating m coefficients. That is, when an RST is performed by applying an m×48 transform kernel matrix (m≤16) to an 8×8 region, 48 pieces of data are input and m coefficients are generated. When m is 16, 48 pieces of data are input and 16 coefficients are generated. That is, assuming that 48 pieces of data form a 48×1 vector, a 16×48 matrix and a 48×1 vector are sequentially multiplied, thereby generating a 16×1 vector. Here, the 48 pieces of data forming the 8×8 region may be properly arranged, thereby forming the 48×1 vector. For example, a 48×1 vector may be constructed based on 48 pieces of data constituting a region excluding the bottom right 4×4 region among the 8×8 regions. Here, when a matrix operation is performed by applying a maximum 16×48 transform kernel matrix, 16 modified transform coefficients are generated, and the 16 modified transform coefficients may be arranged in a top-left 4×4 region according to a scanning order, and a top-right 4×4 region and a bottom-left 4×4 region may be filled with zeros.

For an inverse transform in a decoding process, the transposed matrix of the foregoing transform kernel matrix may be used. That is, when an inverse RST or LFNST is performed in the inverse transform process performed by the decoding apparatus, input coefficient data to which the inverse RST is applied is configured in a one-dimensional vector according to a predetermined arrangement order, and a modified coefficient vector obtained by multiplying the one-dimensional vector and a corresponding inverse RST matrix on the left of the one-dimensional vector may be arranged in a two-dimensional block according to a predetermined arrangement order.

In summary, in the transform process, when an RST or LFNST is applied to an 8×8 region, a matrix operation of 48 transform coefficients in top-left, top-right, and bottom-left regions of the 8×8 region excluding the bottom-right region among transform coefficients in the 8×8 region and a 16×48 transform kernel matrix. For the matrix operation, the 48 transform coefficients are input in a one-dimensional array. When the matrix operation is performed, 16 modified transform coefficients are derived, and the modified transform coefficients may be arranged in the top-left region of the 8×8 region.

On the contrary, in the inverse transform process, when an inverse RST or LFNST is applied to an 8×8 region, 16 transform coefficients corresponding to a top-left region of the 8×8 region among transform coefficients in the 8×8 region may be input in a one-dimensional array according to a scanning order and may be subjected to a matrix operation with a 48×16 transform kernel matrix. That is, the matrix operation may be expressed as (48×16 matrix)*(16×1 transform coefficient vector)=(48×1 modified transform coefficient vector). Here, an n×1 vector may be interpreted to have the same meaning as an n×1 matrix and may thus be expressed as an n×1 column vector. Further, * denotes matrix multiplication. When the matrix operation is performed, 48 modified transform coefficients may be derived, and the 48 modified transform coefficients may be arranged in top-left, top-right, and bottom-left regions of the 8×8 region excluding a bottom-right region.

When a secondary inverse transform is based on an RST, the inverse transformer 235 of the encoding apparatus 200 and the inverse transformer 322 of the decoding apparatus 300 may include an inverse reduced secondary transformer to derive modified transform coefficients based on an inverse RST on transform coefficients and an inverse primary transformer to derive residual samples for the target block based on an inverse primary transform on the modified transform coefficients. The inverse primary transform refers to the inverse transform of a primary transform applied to a residual. In the present disclosure, deriving a transform coefficient based on a transform may refer to deriving the transform coefficient by applying the transform.

The above-described non-separable transform, the LFNST, will be described in detail as follows. The LFNST may include a forward transform by the encoding apparatus and an inverse transform by the decoding apparatus.

The encoding apparatus receives a result (or a part of a result) derived after applying a primary (core) transform as an input, and applies a forward secondary transform (secondary transform).

$$y = G^T x \qquad \text{[Equation 12]}$$

In Equation 12, x and y are inputs and outputs of the secondary transform, respectively, and G is a matrix representing the secondary transform, and transform basis vectors are composed of column vectors. In the case of an inverse LFNST, when the dimension of the transformation matrix G is expressed as [number of rows×number of columns], in the case of an forward LFNST, the transposition of matrix G becomes the dimension of $G^T$.

For the inverse LFNST, the dimensions of matrix G are [48×16], [48×8], [16×16], [16×8], and the [48×8] matrix and the [16×8] matrix are partial matrices that sampled 8 transform basis vectors from the left of the [48×16] matrix and the [16×16] matrix, respectively.

On the other hand, for the forward LFNST, the dimensions of matrix $G^T$ are [16×48], [8×48], [16×16], [8×16], and the [8×48] matrix and the [8×16] matrix are partial matrices obtained by sampling 8 transform basis vectors from the top of the [16×48] matrix and the [16×16] matrix, respectively.

Therefore, in the case of the forward LFNST, a [48×1] vector or [16×1] vector is possible as an input x, and a [16×1] vector or a [8×1] vector is possible as an output y. In video coding and decoding, the output of the forward primary transform is two-dimensional (2D) data, so to construct the [48×1] vector or the [16×1] vector as the input x, a one-dimensional vector must be constructed by properly arranging the 2D data that is the output of the forward transformation.

FIG. 9 is a diagram illustrating a sequence of arranging output data of a forward primary transformation into a one-dimensional vector according to an example. The left diagrams of (a) and (b) of FIG. 9 show the sequence for constructing a [48×1] vector, and the right diagrams of (a) and (b) of FIG. 9 shows the sequence for constructing a [16×1] vector. In the case of the LFNST, a one-dimensional vector x can be obtained by sequentially arranging 2D data in the same order as in (a) and (b) of FIG. 9.

The arrangement direction of the output data of the forward primary transform may be determined according to an intra prediction mode of the current block. For example, when the intra prediction mode of the current block is in the horizontal direction with respect to the diagonal direction, the output data of the forward primary transform may be arranged in the order of (a) of FIG. 9, and when the intra prediction mode of the current block is in the vertical direction with respect to the diagonal direction, the output data of the forward primary transform may be arranged in the order of (b) of FIG. 9.

According to an example, an arrangement order different from the arrangement orders of (a) and (b) FIG. 9 may be applied, and in order to derive the same result (y vector) as when the arrangement orders of (a) and (b) FIG. 9 is applied, the column vectors of the matrix G may be rearranged according to the arrangement order. That is, it is possible to rearrange the column vectors of G so that each element constituting the x vector is always multiplied by the same transform basis vector.

Since the output y derived through Equation 12 is a one-dimensional vector, when two-dimensional data is required as input data in the process of using the result of the forward secondary transformation as an input, for example, in the process of performing quantization or residual coding, the output y vector of Equation 12 must be properly arranged as 2D data again.

Figure 10:
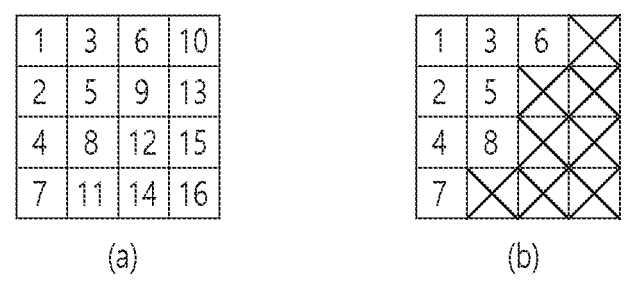

FIG. 10 is a diagram illustrating a sequence of arranging output data of a forward secondary transform into a two-dimensional vector according to an example.

In the case of the LFNST, output values may be arranged in a 2D block according to a predetermined scan order. (a) of FIG. 10 shows that when the output y is a [16×1] vector, the output values are arranged at 16 positions of the 2D block according to a diagonal scan order. (b) of FIG. 10 shows that when the output y is a [8×1] vector, the output values are arranged at 8 positions of the 2D block according to the diagonal scan order, and the remaining 8 positions are filled with zeros. X in (b) of FIG. 10 indicates that it is filled with zero.

According to another example, since the order in which the output vector y is processed in performing quantization or residual coding may be preset, the output vector y may not be arranged in the 2D block as shown in FIG. 10. However, in the case of the residual coding, data coding may be performed in 2D block (eg, 4×4) units such as CG (Coefficient Group), and in this case, the data are arranged according to a specific order as in the diagonal scan order of FIG. 10.

Meanwhile, the decoding apparatus may configure the one-dimensional input vector y by arranging two-dimensional data output through a dequantization process or the like according to a preset scan order for the inverse transformation. The input vector y may be output as the output vector x by the following equation.

$$x = Gy \qquad \text{[Equation 13]}$$

In the case of the inverse LFNST, an output vector x can be derived by multiplying an input vector y, which is a [16×1] vector or a [8×1] vector, by a G matrix. For the inverse LFNST, the output vector x can be either a [48×1] vector or a [16×1] vector.

The output vector x is arranged in a two-dimensional block according to the order shown in FIG. 9 and is arranged as two-dimensional data, and this two-dimensional data becomes input data (or a part of input data) of the inverse primary transformation.

Accordingly, the inverse secondary transformation is the opposite of the forward secondary transformation process as a whole, and in the case of the inverse transformation, unlike in the forward direction, the inverse secondary transformation is first applied, and then the inverse primary transformation is applied.

In the inverse LFNST, one of 8 [48×16] matrices and 8 [16×16] matrices may be selected as the transformation matrix G. Whether to apply the [48×16] matrix or the [16×16] matrix depends on the size and shape of the block.

In addition, 8 matrices may be derived from four transform sets as shown in Table 3 above, and each transform set may consist of two matrices. Which transform set to use among the 4 transform sets is determined according to the intra prediction mode, and more specifically, the transform set is determined based on the value of the intra prediction mode extended by considering the Wide Angle Intra Prediction (WAIP). Which matrix to select from among the two matrices constituting the selected transform set is derived through index signaling. More specifically, 0, 1, and 2 are possible as the transmitted index value, 0 may indicate that the LFNST is not applied, and 1 and 2 may indicate any one of two transform matrices constituting a transform set selected based on the intra prediction mode value.

Meanwhile, Table 3 above shows how a transform set is selected based on the intra prediction mode value extended by the WAIP in the LFNST. As shown in FIG. 5, modes 14 to 33 and modes 35 to 80 are symmetric with respect to the prediction direction around mode 34. For example, mode 14 and mode 54 are symmetric with respect to the direction corresponding to mode 34. Therefore, the same transform set is applied to modes located in mutually symmetrical directions, and this symmetry is also reflected in Table 3.

Meanwhile, it is assumed that forward LFNST input data for mode 54 is symmetrical with the forward LFNST input data for mode 14. For example, for mode 14 and mode 54, the two-dimensional data is rearranged into one-dimensional data according to the arrangement order shown in (a) of FIG. 9 and (b) of FIG. 9, respectively. In addition, it can be seen that the patterns in the order shown in (a) of FIG. 9 and (b) of FIG. 9 are symmetrical with respect to the direction (diagonal direction) indicated by Mode 34.

Meanwhile, as described above, which transform matrix of the [48×16] matrix and the [16×16] matrix is applied to the LFNST is determined by the size and shape of the transform target block.

FIG. 11 is a diagram illustrating a block shape to which the LFNST is applied. (a) of FIG. 11 shows 4×4 blocks, (b) shows 4×8 and 8×4 blocks, (c) shows 4×N or N×4 blocks in which N is 16 or more, (d) shows 8×8 blocks, (e) shows M×N blocks where M≥8, N≥8, and N>8 or M>8.

In FIG. 11, blocks with thick borders indicate regions to which the LFNST is applied. For the blocks of FIGS. 11 (a) and (b), the LFNST is applied to the top-left 4×4 region, and for the block of FIG. 11 (c), the LFNST is applied individually to the two top-left 4×4 regions are continuously arranged. In (a), (b), and (c) of FIG. 11, since the LFNST is applied in units of 4×4 regions, this LFNST will be hereinafter referred to as "4×4 LFNST". As a corresponding transformation matrix, a [16×16] or [16×8] matrix may be applied based on the matrix dimension for G in Equations 12 and 13.

More specifically, the [16×8] matrix is applied to the 4×4 block (4×4 TU or 4×4 CU) of FIG. 11 (a) and the [16×16] matrix is applied to the blocks in (b) and (c) of FIG. 11. This is to adjust the computational complexity for the worst case to 8 multiplications per sample.

With respect to (d) and (e) of FIG. 11, the LFNST is applied to the top-left 8×8 region, and this LFNST is hereinafter referred to as "8×8 LFNST". As a corresponding transformation matrix, a [48×16] matrix or [48×8] matrix may be applied. In the case of the forward LFNST, since the [48×1] vector (x vector in Equation 12) is input as input data, all sample values of the top-left 8×8 region are not used as input values of the forward LFNST. That is, as can be seen in the left order of FIG. 9 (a) or the left order of FIG. 9 (b), the [48×1] vector may be constructed based on samples belonging to the remaining 3 4×4 blocks while leaving the bottom-right 4×4 block as it is.

The [48×8] matrix may be applied to an 8×8 block (8×8 TU or 8×8 CU) in FIG. 11 (d), and the [48×16] matrix may be applied to the 8×8 block in FIG. 11(e). This is also to adjust the computational complexity for the worst case to 8 multiplications per sample.

Depending on the block shape, when the corresponding forward LFNST (4×4 LFNST or 8×8 LFNST) is applied, 8 or 16 output data (y vector in Equation 12, [8×1] or [16×1] vector) is generated. In the forward LFNST, the number of output data is equal to or less than the number of input data due to the characteristics of the matrix $G^T$.

FIG. 12 is a diagram illustrating an arrangement of output data of a forward LFNST according to an example, and shows a block in which output data of the forward LFNST is arranged according to a block shape.

The shaded area at the top-left of the block shown in FIG. 12 corresponds to the area where the output data of the forward LFNST is located, the positions marked with 0 indicate samples filled with 0 values, and the remaining area represents regions that are not changed by the forward LFNST. In the area not changed by the LFNST, the output data of the forward primary transform remains unchanged.

As described above, since the dimension of the transform matrix applied varies according to the shape of the block, the number of output data also varies. As FIG. 12, the output data of the forward LFNST may not completely fill the top-left 4×4 block. In the case of (a) and (d) of FIG. 12, a [16×8] matrix and a [48×8] matrix are applied to the block indicated by a thick line or a partial region inside the block, respectively, and a [8×1] vector as the output of the forward LFNST is generated. That is, according to the scan order shown in (b) of FIG. 10, only 8 output data may be filled as shown in (a) and (d) of FIG. 12, and 0 may be filled in the remaining 8 positions. In the case of the LFNST applied block of FIG. 11 (d), as shown in FIG. 12(d), two 4×4 blocks in the top-right and bottom-left adjacent to the top-left 4×4 block are also filled with 0 values.

As described above, basically, by signaling the LFNST index, whether to apply the LFNST and the transform matrix to be applied are specified. As shown FIG. 12, when the LFNST is applied, since the number of output data of the forward LFNST may be equal to or less than the number of input data, a region filled with a zero value occurs as follows.

1) As shown in (a) of FIG. 12, samples from the 8th and later positions in the scan order in the top-left 4×4 block, that is, samples from the 9th to the 16th.

2) As shown in (d) and (e) of FIG. 12, when the [16×48] matrix or the [8×48] matrix is applied, two 4×4 blocks adjacent to the top-left 4×4 block or the second and third 4×4 blocks in the scan order.

Therefore, if non-zero data exists by checking the areas 1) and 2), it is certain that the LFNST is not applied, so that the signaling of the corresponding LFNST index can be omitted.

According to an example, for example, in the case of LFNST adopted in the VVC standard, since signaling of the LFNST index is performed after the residual coding, the encoding apparatus may know whether there is the non-zero data (significant coefficients) for all positions within the TU or CU block through the residual coding. Accordingly, the encoding apparatus may determine whether to perform signaling on the LFNST index based on the existence of the non-zero data, and the decoding apparatus may determine whether the LFNST index is parsed. When the non-zero data does not exist in the area designated in 1) and 2) above, signaling of the LFNST index is performed.

Since a truncated unary code is applied as a binarization method for the LFNST index, the LFNST index consists of up to two bins, and 0, 10, and 11 are assigned as binary codes for possible LFNST index values of 0, 1, and 2, respectively. According to an example, context-based CABAC coding may be applied to the first bin (regular coding), and context-based CABAC coding may be applied to the second bin as well. The coding of the LFNST index is shown in the table below.

TABLE 4

| Syntax element | binIdx | | | | | |
|---|---|---|---|---|---|---|
| | 0 | 1 | 2 | 3 | 4 | >= 5 |
| ...... | ...... | | | | | |
| lfnst_idx[ ][ ] | ( treeType 1= SINGLE_TREE ) ? 1 : 0 | 2 | na | na | na | na |
| ...... | ...... | ...... | ...... | ...... | ...... | ...... |

As shown in Table 4, for the first bin (binIdx=0), context 0 is applied in the case of a single tree, and context 1 can be applied in the case of a non-single tree. Also, as shown in Table 4, context 2 can be applied to the second bin (binIdx=1). That is, two contexts may be allocated to the first bin, one context may be allocated to the second bin, and each context may be distinguished by a ctxInc value (0, 1, 2).

Here, the single tree means that the luma component and the chroma component are coded with the same coding structure. When the coding unit is divided while having the same coding structure, and the size of the coding unit becomes less than or equal to a specific threshold, and the luma component and the chroma component are coded with a separate tree structure, the corresponding coding unit is regarded as a dual tree, and thus the context of the first bin can be determined. That is, as shown in Table 3, context 1 can be allocated.

Alternatively, when the value of the variable treeType is assigned as SINGLE_TREE for the first bin, context 0 may be used, otherwise context 1 may be used.

Meanwhile, for the adopted LFNST, the following simplification methods may be applied.

(i) According to an example, the number of output data for the forward LFNST may be limited to a maximum of 16.

In the case of (c) of FIG. 11, the 4×4 LFNST may be applied to two 4×4 regions adjacent to the top-left, respectively, and in this case, a maximum of 32 LFNST output data may be generated. when the number of output data for forward LFNST is limited to a maximum of 16, in the case of 4×N/N×4 (N>16) blocks (TU or CU), the 4×4 LFNST is only applied to one 4×4 region in the top-left, the LFNST may be applied only once to all blocks of FIG. 11. Through this, the implementation of image coding may be simplified.

FIG. 13 shows that the number of output data for the forward LFNST is limited to a maximum of 16 according to an example. As FIG. 13, when the LFNST is applied to the most top-left 4×4 region in a 4×N or N×4 block in which N is 16 or more, the output data of the forward LFNST becomes 16 pieces.

(ii) According to an example, zero-out may be additionally applied to a region to which the LFNST is not applied. In this document, the zero-out may mean filling values of all positions belonging to a specific region with a value of 0. That is, the zero-out can be applied to a region that is not changed due to the LFNST and maintains the result of the forward primary transformation. As described above, since the LFNST is divided into the 4×4 LFNST and the 8×8 LFNST, the zero-out can be divided into two types ((ii)-(A) and (ii)-(B)) as follows.

Figure 14:
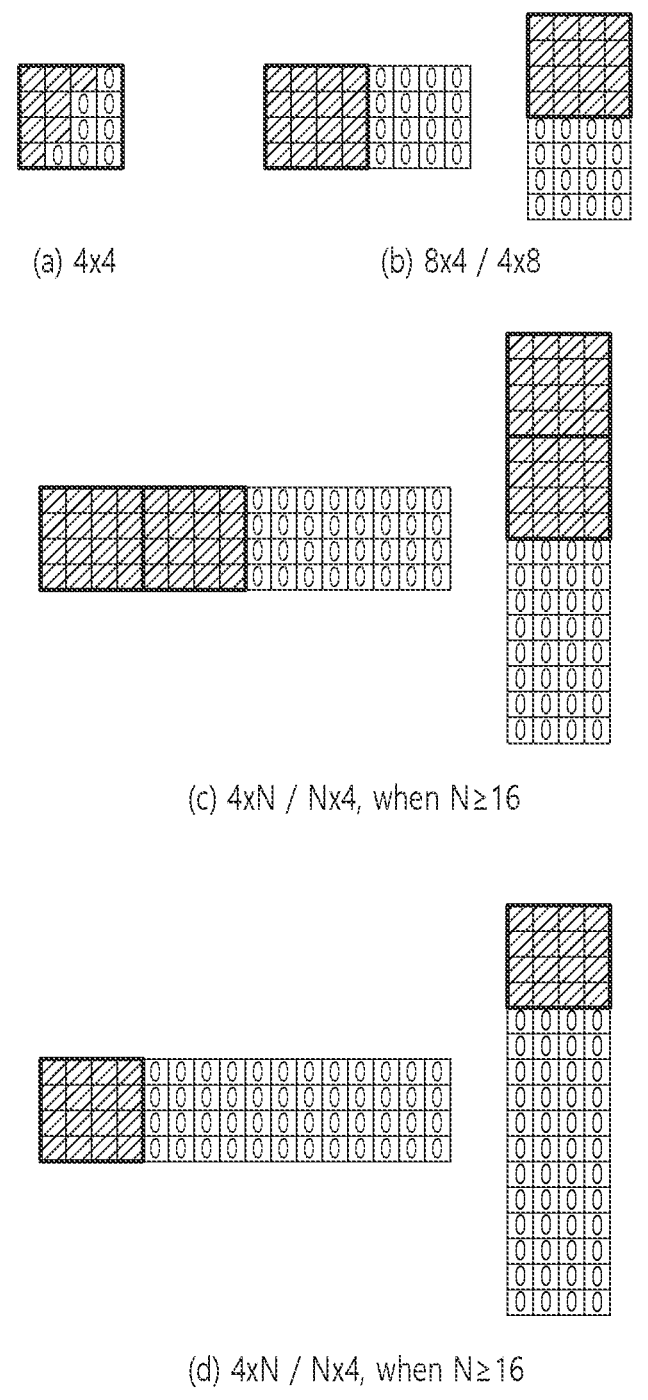

(ii)-(A) When the 4×4 LFNST is applied, a region to which the 4×4 LFNST is not applied may be zeroed out. FIG. 14 is a diagram illustrating the zero-out in a block to which the 4×4 LFNST is applied according to an example.

As shown in FIG. 14, with respect to a block to which the 4×4 LFNST is applied, that is, for all of the blocks in (*a*), (*b*) and (*c*) of FIG. 12, the whole region to which the LFNST is not applied may be filled with zeros.

On the other hand, (*d*) of FIG. 14 shows that when the maximum value of the number of the output data of the forward LFNST is limited to 16 as shown in FIG. 13, the zero-out is performed on the remaining blocks to which the 4×4 LFNST is not applied.

Figure 15:
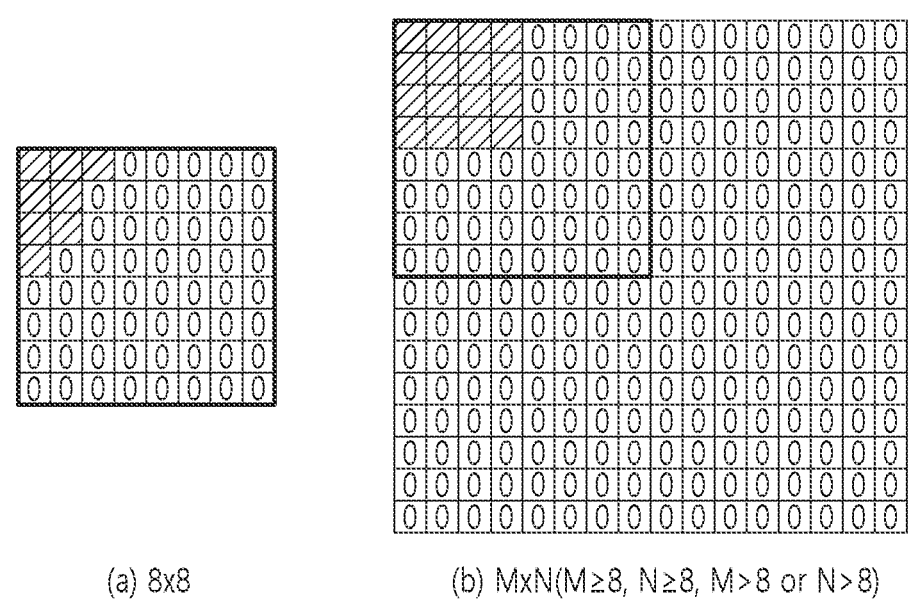

(ii)-(B) When the 8×8 LFNST is applied, a region to which the 8×8 LFNST is not applied may be zeroed out. FIG. 15 is a diagram illustrating the zero-out in a block to which the 8×8 LFNST is applied according to an example.

As shown in FIG. 15, with respect to a block to which the 8×8 LFNST is applied, that is, for all of the blocks in (*d*) and (*e*) of FIG. 12, the whole region to which the LFNST is not applied may be filled with zeros.

(iii) Due to the zero-out presented in (ii) above, the area filled with zeros may be not same when the LFNST is applied. Accordingly, it is possible to check whether the non-zero data exists according to the zero-out proposed in (ii) over a wider area than the case of the LFNST of FIG. 12.

For example, when (ii)-(B) is applied, after checking whether the non-zero data exists where the area filled with zero values in (*d*) and (*e*) of FIG. 12 in addition to the area filled with 0 additionally in FIG. 15, signaling for the LFNST index can be performed only when the non-zero data does not exist.

Of course, even if the zero-out proposed in (ii) is applied, it is possible to check whether the non-zero data exists in the same way as the existing LFNST index signaling. That is, after checking whether the non-zero data exists in the block filled with zeros in FIG. 12, the LFNST index signaling may be applied. In this case, the encoding apparatus only performs the zero out and the decoding apparatus does not assume the zero out, that is, checking only whether the non-zero data exists only in the area explicitly marked as 0 in FIG. 12, may perform the LFNST index parsing.

Figure 16:
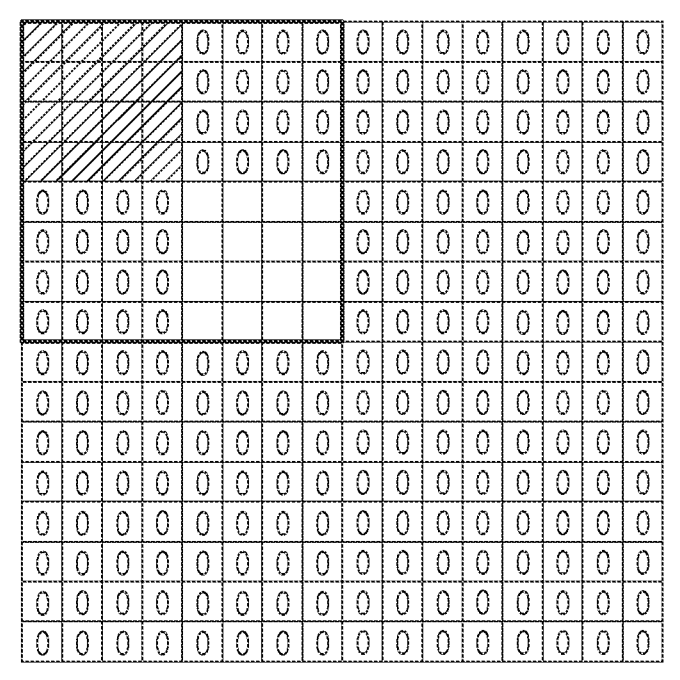

Alternatively, according to another example, the zero-out may be performed as shown in FIG. 16. FIG. 16 is a diagram illustrating the zero-out in a block to which the 8×8 LFNST is applied according to another example.

As shown in FIGS. 14 and 15, the zero-out may be applied to all regions other than the region to which the LFNST is applied, or the zero-out may be applied only to a partial region as shown in FIG. 16. The zero-out is applied only to regions other than the top-left 8×8 region of FIG. 16, the zero-out may not be applied to the bottom-right 4×4 block within the top-left 8×8 region.

Various embodiments in which combinations of the simplification methods ((i), (ii)-(A), (ii)-(B), (iii)) for the LFNST are applied may be derived. Of course, the combinations of the above simplification methods are not limited to the following embodiments, and any combination may be applied to the LFNST.

Embodiment

Limit the number of output data for forward LFNST to a maximum of 16→(i)

When the 4×4 LFNST is applied, all areas to which the 4×4 LFNST is not applied are zero-out→(ii)-(A)

When the 8×8 LFNST is applied, all areas to which the 8×8 LFNST is not applied are zero-out→(ii)-(B)

After checking whether the non-zero data exists also the existing area filled with zero value and the area filled with zeros due to additional zero outs ((ii)-(A), (ii)-(B)), the LFNST index is signaled only when the non-zero data does not exist→(iii)

In the case of Embodiment, when the LFNST is applied, an area in which the non-zero output data can exist is limited to the inside of the top-left 4×4 area. In more detail, in the case of FIG. 14 (*a*) and FIG. 15 (*a*), the 8th position in the scan order is the last position where non-zero data can exist. In the case of FIGS. 14 (*b*) and (*c*) and FIG. 15 (*b*), the 16th position in the scan order (ie, the position of the bottom-right edge of the top-left 4×4 block) is the last position where data other than 0 may exist.

Therefore, when the LFNST is applied, after checking whether the non-zero data exists in a position where the residual coding process is not allowed (at a position beyond the last position), it can be determined whether the LFNST index is signaled.

In the case of the zero-out method proposed in (ii), since the number of data finally generated when both the primary transform and the LFNST are applied, the amount of computation required to perform the entire transformation process can be reduced. That is, when the LFNST is applied, since zero-out is applied to the forward primary transform output data existing in a region to which the LFNST is not applied, there is no need to generate data for the region that become zero-out during performing the forward primary transform. Accordingly, it is possible to reduce the amount of computation required to generate the corresponding data. The additional effects of the zero-out method proposed in (ii) are summarized as follows.

First, as described above, the amount of computation required to perform the entire transform process is reduced.

In particular, when (ii)-(B) is applied, the amount of calculation for the worst case is reduced, so that the transform process can be lightened. In other words, in general, a large amount of computation is required to perform a large-size primary transformation. By applying (ii)-(B), the number of data derived as a result of performing the forward LFNST can be reduced to 16 or less. In addition, as the size of the entire block (TU or CU) increases, the effect of reducing the amount of transform operation is further increased.

Second, the amount of computation required for the entire transform process can be reduced, thereby reducing the power consumption required to perform the transform.

Third, the latency involved in the transform process is reduced.

The secondary transformation such as the LFNST adds a computational amount to the existing primary transformation, thus increasing the overall delay time involved in performing the transformation. In particular, in the case of intra prediction, since reconstructed data of neighboring blocks is used in the prediction process, during encoding, an increase in latency due to a secondary transformation leads to an increase in latency until reconstruction. This can lead to an increase in overall latency of intra prediction encoding.

However, if the zero-out suggested in (ii) is applied, the delay time of performing the primary transform can be greatly reduced when LFNST is applied, the delay time for the entire transform is maintained or reduced, so that the encoding apparatus can be implemented more simply.

Meanwhile, the signaling of the LFNST index and the MTS index will be described below.

According to another example, the coding unit syntax table, the transform unit syntax table, and the residual coding syntax table are as follows. According to Table 5, the MTS index moves from the transform unit level to the coding unit level syntax, and is signaled after LFNST index signaling. In addition, the constraint that does not allow LFNST when the ISP is applied to the coding unit has been removed. When the ISP is applied to the coding unit, the constraint that does not allow the LFNST is removed, so that the LFNST can be applied to all intra prediction blocks. In addition, both the MTS index and the LFNST index are conditionally signaled in the last part of the coding unit level.

TABLE 5 coding_unit( x0, y0, cbWidth, cbHeight, cqtDepth, treeType, modeType ) {
...
   LfnstDcOnly = 1
   LfnstZeroOutSigCoeffFlag = 1
   MtsZeroOutSigCoeffFlag = 1
   transform_tree( x0, y0, cbWidth, cbHeight, treeType )
   lfnstWidth = ( treeType = = DUAL_TREE_CHROMA ) ? cbWidth / SubWidthC
     : ( IntraSubPartitionsSplitType = =
ISP_VER_SPLIT) ? cbWidth / NumIntraSubPartitions : cbWidth
   lfnstHeight = ( treeType = = DUAL_TREE_CHROMA ) ? cbHeight / SubHeightC
     : ( IntraSubPartitionsSplitType = =
ISP_HOR_SPLIT) ? cbHeight / NumIntraSubPartitions : cbHeight
   if( Min( lfnstWidth, lfnstHeight ) >= 4 && sps_lfnst_enabled_flag = = 1 &&
     CuPredMode[ chType ][ x0 ][ y0 ] = = MODE_INTRA &&
     ( !intra_mip_flag[ x0 ][ y0 ] | | Min( lfnstWidth, lfnstHeight ) >= 16 ) &&
    Max( cbWidth, cbHeight ) <= MaxTbSizeY) {
      if ( ( IntraSubPartitionsSplitType ! = ISP_NO_SPLIT | | LfnstDcOnly = = 0 ) &&
LfnstZeroOutSigCoeffFlag = = 1 )
       lfnst_idx[ x0 ][ y0 ]
   }
   if( treeType != DUAL_TREE_CHROMA && lfnst_idx[ x0 ][ y0 ] = = 0 &&
     transform_skip_flag[ x0 ][ y0 ] = = 0 && Max( cbWidth, cbHeight ) <= 32 &&
     IntraSubPartitionsSplit[ x0 ][ y0 ] = = ISP_NO_SPLIT && ( !cu_sbt_flag ) &&
     MtsZeroOutSigCoeffFlag = = 1 && tu_cbf_luma[ x0 ][ y0 ] ) {
    if( ( CuPredMode[ chType ][ x0 ][ y0 ] = = MODE_INTER &&
     sps_explicit_mts_inter_enabled_flag )
     | | ( CuPredMode[ chType ][ x0 ][ y0 ] = = MODE_INTRA &&
     sps_explicit_mts_intra_enabled_flag ) ) )
      mts_idx[ x0 ][ y0 ]
   }
...

TABLE 6

```
transform _unit( x0, y0, tbWidth, tbHeight, treeType, subTuIndex, chType ) {
...
  if( tu_cbf luma[ x0 ][ y0 ] && treeType != DUAL_TREE_CHROMA
      && ( tbWidth <= 32) && ( tbHeight <= 32 )
      && (IntraSubPartitionsSplit[ x0 ][ y0 ] = = ISP_NO_SPLIT ) && ( !cu_sbt_flag ) ) {
    if( sp_transform_skip_enabled_flag && !BdpcmFlag[ x0 ][ y0 ] &&
        tbWidth <= MaxTsSize && tbHeight <= MaxTsSize )
        transform_skip_flag[ x0 ][ y0 ]
  }
...
```

TABLE 7

```
residual_coding( x0, y0, log2TbWidth, log2TbHeight, cIdx ) {
....
  if ( ( cu_sbt_flag && log2TbWidth < 6 && log2TbHeight < 6 )
      && cIdx = = 0 && log2TbWidth > 4 )
      log2ZoTbWidth = 4
  else
      log2ZoTbWidth = Min( log2TbWidth, 5 )
  MaxCcbs = 2 * ( 1 << log2TbWidth ) * ( 1<< log2TbHeight )
  if ( ( cu_sbt_flag && log2TbWidth < 6 && log2TbHeight < 6 )
      && cIdx = = 0 && log2TbHeight > 4 )
      log2ZoTbHeight = 4
  else
      log2ZoTbHeight = Min( log2TbHeight, 5 )
...
  if( ( lastSubBlock > 0 && log2TbWidth >= 2 && log2TbHeight >= 2 ) | |
      ( lastScanPos > 7 && ( log2TbWidth = = 2 | | log2TbWidth = = 3 ) &&
      log2TbWidth = = log2TbHeight ) )
      LfnstZeroOutSigCoeffFlag = 0
  if( ( LastSignificantCoeffX > 15 | | LastSignificantCoeffY > 15 ) && cIdx = = 0 )
      MtsZeroOutSigCoeffFlag = 0
...
```

The meanings of the major variables shown in Table are as follows.

1. cbWidth, cbHeight: the width and height of the current coding block 2. log 2TbWidth, log 2TbHeight: the log value of base-2 for the width and height of the current transform block, it may be reduced, by reflecting the zero-out, to a top-left region in which a non-zero coefficient may exist.

3. sps_lfnst_enabled_flag: a flag indicating whether or not the LFNST is enabled, if the flag value is 0, it indicates that the LFNST is not enabled, and if the flag value is 1, it indicates that the LFNST is enabled. It is defined in the sequence parameter set (SPS).

4. CuPredMode[chType] [x0] [y0]: a prediction mode corresponding to the variable chType and the (x0, y0) position, chType may have values of 0 and 1, wherein 0 indicates a luma component and 1 indicates a chroma component. The (x0, y0) position indicates a position on the picture, and MODE_INTRA (intra prediction) and MODE_INTER (inter prediction) are possible as a value of CuPredMode[chType][x0][y0].

5. IntraSubPartitionsSplit[x0][y0]: the contents of the (x0, y0) position are the same as in No. 4. It indicates which ISP partition at the (x0, y0) position is applied, ISP_NO_SPLIT indicates that the coding unit corresponding to the (x0, y0) position is not divided into partition blocks.

6. intra_mip_flag[x0][y0]: the contents of the (x0, y0) position are the same as in No. 4 above. The intra_mip_flag is a flag indicating whether or not a matrix-based intra prediction (MIP) prediction mode is applied. If the flag value is 0, it indicates that MIP is not enabled, and if the flag value is 1, it indicates that MIP is enabled.

7. cIdx: the value of 0 indicates luma, and the values of 1 and 2 indicate Cb and Cr which are respectively chroma components.

8. treeType: indicates single-tree and dual-tree, etc. (SINGLE_TREE: single tree, DUAL_TREE_LUMA: dual tree for luma component, DUAL_TREE_CHROMA: dual tree for chroma component)

9. lastSubBlock: It indicates a position in the scan order of a sub-block (Coefficient Group (CG)) in which the last non-zero coefficient is located. 0 indicates a sub-block in which the DC component is included, and in the case of being greater than 0, it is not a sub-block in which the DC component is included.

10. lastScanPos: It indicates the position where the last significant coefficient is in the scan order within one sub-block. If one sub-block includes 16 positions, values from 0 to 15 are possible.

11. lfnst_idx[x0][y0]: LFNST index syntax element to be parsed. If it is not parsed, it is inferred as a value of 0. That is, the default value is set to 0, indicating that LFNST is not applied.

12. LastSignificantCoeffX, LastSignificantCoeffY: They indicate the x and y coordinates where the last significant coefficient is located in the transform block. The x-coordinate starts at 0 and increases from left to right, and the y-coordinate starts at 0 and increases from top to bottom. If the values of both variables are 0, it means that the last significant coefficient is located at DC.

13. cu_sbt_flag: A flag indicating whether or not Sub-Block Transform (SBT) included in the current VVC standard is enabled. If a flag value is 0, it indicates that SBT is not enabled, and if the flag value is 1, it indicates that SBT is enabled.

14. sps_explicit_mts_inter_enabled_flag, sps_explicit_mts_intra_enabled_flag: Flags indicating whether or not explicit MTS is applied to inter CU and intra CU, respectively. If a corresponding flag value is 0, it indicates that MTS is not enabled to an inter CU or an intra CU, and if the corresponding flag value is 1, it indicates that MTS is enabled.

15. tu_mts_idx[x0][y0]: MTS index syntax element to be parsed. If it is not parsed, it is inferred as a value of 0. That is, the default value is set to 0, indicating that DCT-2 is enabled to both the horizontal and vertical directions.

As shown in Table 5, several conditions are checked when coding mts_idx[x0][y0], and only when the lfnst_idx[x0][y0] value is 0, tu_mts_idx[x0][y0] is signaled.

In addition, tu_cbf_luma[x0][y0] is a flag indicating whether a significant coefficient exists for the luma component.

According to Table 5, when both the width and the height of the coding unit for the luma component are 32 or less, mts_idx[x0][y0] is signaled (Max(cbWidth, cbHeight)<=32), that is, whether or not MTS is applied is determined by the width and height of the coding unit for the luma component.

Further, according to Table 5, even in the ISP mode, (IntraSubPartitionsSplitType!=ISP_NO_SPLIT) lfnst_idx[x0][y0] may be configured to be signaled, and the same LFNST index value may be applied to all ISP partition blocks.

On the other hand, mts_idx[x0][y0] can be signaled only when not in the ISP mode (IntraSubPartitionsSplit[x0][y0]==ISP_NO_SPLIT).

In Table 7, log 2ZoTbWidth and log 2ZoTbHeight mean log values whose width and height base are 2 (base-2) for the top-left region where the last significant coefficient may exist by zero-out, respectively. The checking the mts_idx[x0][y0] value may be omitted.

In addition, according to an example, a condition for checking sps_mts_enable_flag may be added when determining log 2ZoTbWidth and log 2ZoTbHeight in residual coding.

The variable LfnstZeroOutSigCoeffFlag of Table 5 is 0 when there is a significant coefficient at the zero-out position when LFNST is applied, otherwise it is 1. The variable LfnstZeroOutSigCoeffFlag can be set according to several conditions shown in Table 7.

According to an example, the variable LfnstDcOnly in Table 5 is equal to 1 when all last significant coefficients are located at DC positions (top-left positions) for transform blocks having a coded block flag (CBF, equal to 0 if there is at least one significant coefficient in a corresponding block, and is equal to 0 otherwise) of 1, and is equal to 0 otherwise. Specifically, in a case of dual tree luma, the position of the last significant coefficient is checked with respect to one luma transform block, and in a case of dual tree chroma, the position of the last significant coefficient is checked with respect to both a transform block for Cb and a transform block for Cr. In a case of a single tree, the position of the last significant coefficient may be checked with respect to transform block for luma, Cb, and Cr.

In Table 5, MtsZeroOutSigCoeffFlag is initially set to 1, and this value may be changed in residual coding in Table 7. The value of a variable MtsZeroOutSigCoeffFlag is changed from 1 to 0 when a significant coefficient exists in a region (LastSignificantCoeffX>15||LastSignificantCoeffY>15) to be filled with 0s by a zero-out, in which case the MTS index is not signaled as shown in Table 5.

Meanwhile, as shown in Table 5 when tu_cbf_luma[x0][y0] is 0, mts_idx[x0][y0] coding may be omitted. That is, when the CBF value of the luma component is 0, since the transform is not applied, there is no need to signal the MTS index, and thus the MTS index coding may be omitted.

According to an example, the above technical feature may be implemented in another conditional syntax. For example, after the MTS is performed, a variable indicating whether a significant coefficient exists in a region other than the DC region of the current block may be derived, and when the variable indicates that the significant coefficient exists in the region excluding the DC region, the MTS index can be signaled. That is, the existence of the significant coefficient in the region other than the DC region of the current block indicates that the value of tu_cbf_luma[x0][y0] is 1, and in this case, the MTS index can be signaled.

The variable may be expressed as MtsDcOnly, and after the variable MtsDcOnly is initially set to 1 at the coding unit level, the value is changed to 0 when it is determined that the significant coefficient is present in the region except for the DC region of the current block in the residual coding level. When the variable MtsDcOnly is 0, image information may be configured such that the MTS index is signaled.

When tu_cbf_luma[x0][y0] is 0, since the residual coding syntax is not called at the transform unit level of Table 6, the initial value of 1 of the variable MtsDcOnly is maintained. In this case, since the variable MtsDcOnly is not changed to 0, the image information may be configured so that the MTS index is not signaled. That is, the MTS index is not parsed and signaled.

Meanwhile, the decoding apparatus may determine the color index cIdx of the transform coefficient to derive the variable MtsZeroOutSigCoeffFlag of Table 7. The color index cIdx of 0 means a luma component.

According to an example, since the MTS can be applied only to the luma component of the current block, the decoding apparatus can determine whether the color index is luma when deriving the variable MtsZeroOutSigCoeffFlag for determining whether to parse the MTS index.

The variable MtsZeroOutSigCoeffFlag is a variable indicating whether the zero-out is performed when the MTS is applied. It indicates whether the transform coefficient exists in the top-left region where the last significant coefficient may exist due to the zero-out after the MTS is performed, that is, in the region other than the top-left 16×16 region. The variable MtsZeroOutSigCoeffFlag is initially set to 1 at the coding unit level as shown in Table 5 (MtsZeroOutSigCoeffFlag=1), and when the transform coefficient exists in the region other than the 16×16 region, its value can be changed from 1 to 0 in the residual coding level as shown in Table 7 (MtsZeroOutSigCoeffFlag=0). When the value of the variable MtsZeroOutSigCoeffFlag is 0, the MTS index is not signaled.

As shown in Table 7, at the residual coding level, a non-zero-out region in which a non-zero transform coefficient may exist may be set depending on whether or not the zero-out accompanying the MTS is performed, and even in this case, the color index (cIdx) is 0, the non-zero-out region may be set to the top-left 16×16 region of the current block.

As such, when deriving the variable that determines whether the MTS index is parsed, it is determined whether the color component is luma or chroma. However, since LFNST can be applied to both the luma component and the chroma component of the current block, the color component is not determined when deriving a variable for determining whether to parse the LFNST index.

For example, Table 5 shows a variable LfnstZeroOutSigCoeffFlag that may indicate that zero-out is performed when LFNST is applied. The variable LfnstZeroOutSigCoeffFlag indicates whether a significant coefficient exists in the second region except for the first region at the top-left of the current block. This value is initially set to 1, and when the significant coefficient is present in the second region, the value can be changed to 0. The LFNST index can be parsed only when the value of the initially set variable LfnstZeroOutSigCoeffFlag is maintained at 1. When determining and deriving whether the variable LfnstZeroOutSigCoeffFlag value is 1, since the LFNST may be applied to both the luma component and the chroma component of the current block, the color index of the current block is not determined.

According to an example, the prediction may be based on a palette coding. The palette coding is a useful technique for representing blocks that include a small number of unique color values. Instead of applying prediction and transform to the blocks, in the palette mode, an index to represent the value of each sample is signaled. In order to decode a block encoded using the palette mode, the decoder must decode a palette entry and index. The palette entry may be represented by a palette table and may be encoded by a palette table coding tool.

For example, when the palette mode is selected, information on the palette table may be signaled. The palette table may include an index corresponding to each pixel. The palette table may be constructed a palette prediction table from pixel values used in the previous block. For example, previously used pixel values are stored in a specific buffer (palette predictor), and palette predictor information (palette_predictor_run) for constructing the current palette may be received from this buffer. That is, the palette predictor may include data indicating an index for at least a portion of a palette index map of the current block. When the palette entry for representing the current block is not sufficient with the palette prediction entry constructed from the palette predictor, pixel information for the current palette entry may be transmitted separately.

The palette mode is signaled at the CU level and can generally be used when most pixels in a CU can be represented by a set of representative pixel values. That is, in the palette mode, samples in the CU may be represented as a set of representative pixel values. Such a set may be referred to as a palette. In the case of a sample having a value close to the pixel value in the palette, a palette index (palette_idx_idc) or information (run_copy_flag, copy_above_palette_indices_flag) that may indicate the index corresponding to the pixel value in the palette may be signaled. For a sample with a pixel value other than the palette entry, the sample may be marked with an escape symbol and the quantized sample value may be signaled directly. In this document, a pixel or pixel value may be referred to as a sample or sample value.

In order to decode a block coded in the palette mode, the decoder needs palette entry information and palette index information. When the palette index corresponds to the escape symbol, a (quantized) escape value may be signaled as an additional component. In addition, the encoder should derive an appropriate palette for the CU and deliver it to the decoder.

For efficient coding of palette entries, a palette predictor may be maintained. The palette predictor and the maximum size of the palette may be signaled in the SPS. Alternatively, the palette predictor and the palette maximum size may be predefined. For example, the palette predictor and the maximum palette size may be defined as 31 and 15, respectively, depending on whether the current block is a single tree or a dual tree. In the VVC standard, sps_palette_enabled_flag indicating whether the palette mode is available may be transmitted. Then, a pred_mode_plt_coding flag indicating whether the current coding unit is coded in the palette mode may be transmitted. The palette predictor may be initialized at the beginning of each brick or each slice.

For each entry in the palette predictor, a reuse flag may be signaled to indicate whether it is part of the current palette. The reuse flag may be transmitted using a run-length coding of zero. Then, the number of new palette entries may be signaled using 0th order exponential Golomb coding. Finally, a component value for a new palette entry may be signaled. After encoding the current CU, the palette predictor can be updated using the current palette, and entries of the old palette predictor that are not reused in the current palette can be added to the end of the new palette predictor until reaching the maximum size allowed (palette stuffing).

The index can be coded using horizontal and vertical traverse scans to code the palette index map. The scan order may be explicitly signaled from the bitstream using flag information (eg, palette_transpose_flag). Hereinafter, in this document, for convenience of description, a horizontal scanning will be mainly described. Also, this can be applied to the vertical scan as well.

Figure 17:
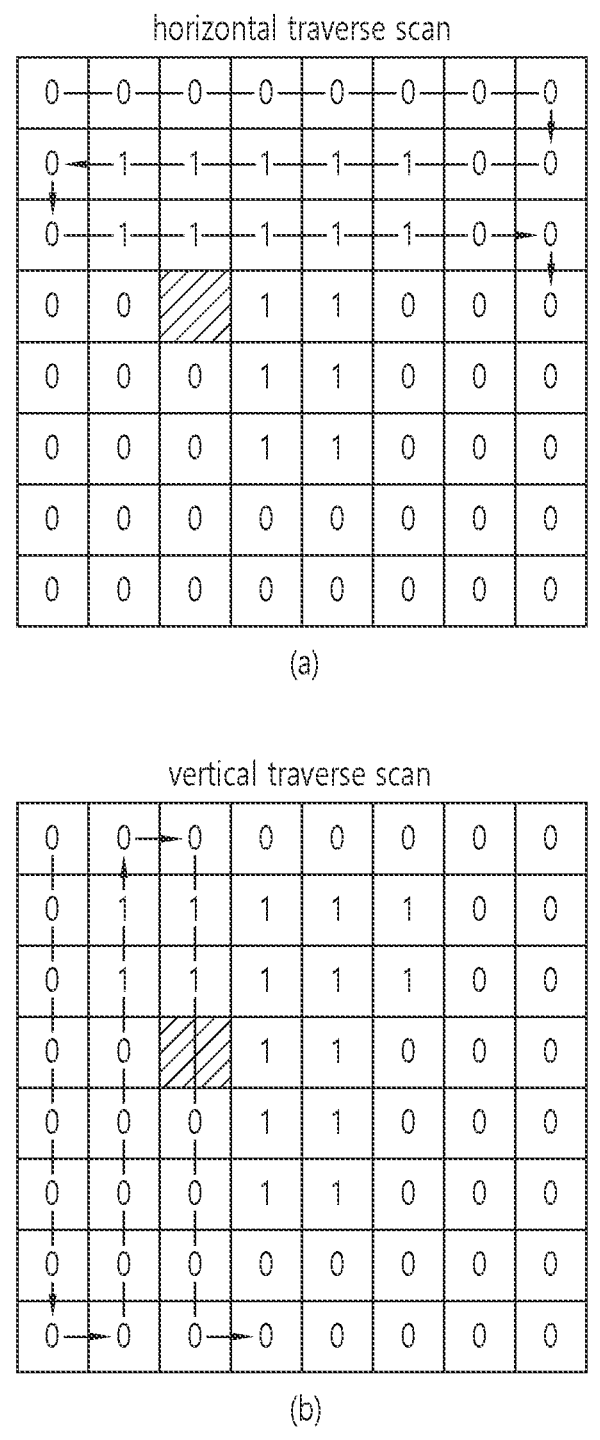

FIG. 17 shows an example for explaining the horizontal and vertical traverse scan methods used to code the palette index map.

(a) of FIG. 17 shows an example of coding the palette index map using a horizontal traverse scan and (b) of FIG. 17 shows an example of coding the palette index map using a vertical traverse scan.

As shown in (a) of FIG. 17, when horizontal scan is used, the palette index can be coded by horizontally scanning from samples in the first row (top row) in the current block (ie, the current CU) to samples in the last row (bottom row).

As shown in (b) of FIG. 17, when vertical scan is used, the palette index may be coded by vertically scanning from samples in the first column (leftmost column) to samples in the last column (rightmost column) in the current block (ie, the current CU).

When an LFNST is applied to a chroma transform block according to an example, it is necessary to refer to information on a collocated luma transform block.

Existing specification text about a relevant part is shown in the following table.

TABLE 8

8.7.4 Transformation process for scaled transform coefficients
8.7.4.1 General

Inputs to this process are:
- a luma location ( xTbY, yTbY ) specifying the top-left sample of the current luma transform block relative to the top-left luma sample of the current picture,
- a variable nTbW specifying the width of the current transform block,
- a variable nTbH specifying the height of the current transform block, TABLE 8-continued 8.7.4 Transformation process for scaled transform coefficients
8.7.4.1 General

- a variable cIdx specifying the colour component of the current block,
an (nTbW)x(nTbH) array d[ x ][ y ] of scaled transform coefficients with x = 0..nTbW − 1,
y = 0..nTbH − 1
...
When lfnst_idx is not equal to 0 and both nTbW and nTbH are greater than or equal to 4, the
following applies:
...
- When predModeIntra is equal to either INTRA_LT_CCLM, INTRA_L_CCLM, or
INTRA_T_CCLM predModeIntra is derived as follows:
-  If intra_mip_flag[ xTbY + nTbW / 2 ][ yTbY + nTbH / 2 ] is equal to 1,
predModeIntra is set equal to INTRA_PLANAR.
-  Otherwise, if CuPredMode[ 0 ][ xTbY + nTbW / 2 ][ yTbY + nTbH / 2 ] is equal
to MODE_IBC or MODE_PLT, predModeIntra is set equal to INTRA_DC.
-  Otherwise, predModeIntra is set equal to IntraPredModeY[ xTbY + nTbW /
2 ][ yTbY + nTbH / 2 ].

As shown in Table 8, when a current intra prediction mode is a CCLM mode, the value of a variable predModeIntra for the chroma transform block is determined by taking an intra prediction mode value for the co-located luma transform block (part indicated in italics). The intra prediction mode value (predModeIntra value) of the luma transform block may be subsequently used to determine an LFNST set.

However, variables nTbW and nTbH input as input values of this transform process denote the width and height of the current transform block. Thus, when the current block is a luma transform block, the variables nTbW and nTbH may denote the width and height of the luma transform block, and when the current block is a chroma transform block, the variables nTbW and nTbH denote the width and height of the chroma transform block.

Here, the variables nTbW and nTbH in the italic part of Table 8 denote the width and height of the chroma transform block that do not reflect the color format and thus do not accurately indicate a reference position of the luma transform block corresponding to the chroma transform block. Therefore, the italic part of Table 8 may be modified as shown in the following table.

TABLE 9

- When predModeIntra is equal to either INTRA_LT_CCLM, INTRA_L_CCLM, or
  INTRA_T_CCLM, predModeIntra is derived as follows:
  - If intra_mip_flag[ xTbY + ( nTbW * SubWidthC ) / 2 ][ yTbY + ( nTbH *
    SubHeightC ) / 2 ] is equal to 1, predModeIntra is set equal to INTRA_PLANAR.
  - Otherwise, if CuPredMode[ 0 ][ xTbY + ( nTbW * SubWidthC ) / 2 ][ yTbY + (nTbH
    * SubHeightC ) / 2 ] is equal to MODE_IBC or MODE_PLT, predModeIntra is set
    equal to INTRA_DC.
  - Otherwise, predModeIntra is set equal to IntraPredModeY[ xTbY + ( nTbW *
    SubWidthC ) / 2 ][ yTbY + ( nTbH * SubHeightC ) / 2 ].

As shown in Table 9, nTbW and nTbH are changed to (nTbW*SubWidthC)/2 and (nTbH*SubHeightC)/2, respectively. xTbY and yTbY may denote a luma position in the current picture (the top-left sample of the current luma transform block relative to the top-left luma sample of the current picture), and nTbW and nTbH may denote the width and height of the transform block currently coded (a variable nTbW specifying the width of the current transform block, and a variable nTbH specifying the height of the current transform block).

When the currently coded transform block is a chroma (Cb or Cr) transform block, nTbW and nTbH are the width and height of the chroma transform block, respectively. Accordingly, when the currently coded transform block is a chroma transform block (cIdx>0), a reference position for a collocated luma transform block needs to be obtained using the width and height of the luma transform block when obtaining the reference position. In Table 9, SubWidthC and SubHeightC are values set according to the color format (e.g., 4:2:0, 4:2:2, or 4:4:4), and specifically, a width ratio and a height ratio between a luma component and a chroma component, respectively (see Table 10 below). Thus, in a case of the chroma transform block, (nTbW*SubWidthC) and (nTbH*SubHeightC) may be the width and height with respect to the collocated luma transform block, respectively.

Consequently, xTbY+(nTbW*SubWidthC)/2 and yTbY+(nTbH*SubHeightC)/2 denote the value of a center position in the collocated luma transform block based on a top-left position of the current picture and can thus precisely indicate the collocated luma transform block.

TABLE 10

| Chroma format | SubWidthC | SubHeightC |
|---|---|---|
| Monochrome | 1 | 1 |
| 4:2:0 | 2 | 2 |

TABLE 10-continued

| Chroma format | SubWidthC | SubHeightC |
|---|---|---|
| 4:2:2 | 2 | 1 |
| 4:4:4 | 1 | 1 |
| 4:4:4 | 1 | 1 |

In Table 9, a variable predModeIntra denotes an intra prediction mode value, and the value of the variable predModeIntra equal to INTRA_LT_CCLM, INTRA_L_CCLM, or INTRA_T_CCLM indicates that the current transform block is a chroma transform block. According to an example, in the current VVC standard, INTRA_LT_CCLM, INTRA_L_CCLM, and INTRA_T_CCLM respectively correspond to mode values of 81, 82, and 83 among intra prediction mode values. Therefore, as shown in Table 9, the reference position for the collocated luma transform block needs to be obtained using the value of xTbY+(nTbW*SubWidthC)/2 and the value of yTbY+(nTbH*SubHeightC)/2.

As shown in Table 9, the value of the variable predModeIntra is updated in view of both a variable intra_mip_flag [xTbY+(nTbW*SubWidthC)/2][yTbY+(nTbH*SubHeightC)/2] and a variable CuPredMode[0][xTbY+(nTbW*SubWidthC)/2][yTbY+(nTbH*SubHeightC)/2].

intra_mip_flag is a variable indicating whether the current transform block (or coding unit) is coded by a matrix-based intra prediction (MIP) method, and intra_mip_flag[x][y] is a flag value indicating whether MIP is applied to a position corresponding to coordinates (x, y) based on the luma component when a top-left position in the current picture is defined as (0, 0). The x and y coordinates increase from left to right and from top to bottom, respectively, and when the flag indicating whether the MIP is applied is 1, the flag indicates that the MIP is applied. When the flag indicating whether the MIP is applied is 0, the flag indicates that the MIP is not applied. The MIP may be applied only to the luma block.

According to the modified part of Table 9, when the value of intra_mip_flag[xTbY+(nTbW*SubWidthC)/2][yTbY+(nTbH*SubHeightC)/2] in the collocated luma transform block is 1, the value of predModeIntra is set to a planar mode (INTRA_PLANAR).

The value of the variable CuPredMode[0][xTbY+(nTbW*SubWidthC)/2][yTbY+(nTbH*SubHeightC)/2] denotes a prediction mode value corresponding to coordinates (xTbY+(nTbW*SubWidthC)/2, yTbY+(nTbH*SubHeightC)/2) when the top-left position of the current picture for the luma component is defined (0, 0). The prediction mode value may have MODE_INTRA, MODE_IBC, MODE_PLT, and MODE_INTER values, which denote an intra prediction mode, an intra block copy (IBC) prediction mode, a palette (PLT) coding mode, and an inter prediction mode, respectively. According to Table 17, when the value of the variable CuPredMode[0][xTbY+(nTbW*SubWidthC)/2][yTbY+(nTbH*SubHeightC)/2] is MODE_IBC or MODE_PLT, the value of the variable predModeIntra is set to a DC mode. In a case other than the two cases, the value of the variable predModeIntra is set to IntraPredModeY[xTbY+(nTbW*SubWidthC)/2][yTbY+(nTbH*SubHeightC)/2] (intra prediction mode value corresponding to a center position in the collocated luma transform block).

According to an example, the value of the variable predModeIntra may be updated once more based on the predModeIntra value updated in Table 9 considering whether wide-angle intra prediction is performed as shown in the following table.

TABLE 11

| 8.4.5.2.6 Wide angle intra prediction mode mapping process |
| --- |
| Inputs to this process are:<br>- a variable predModeIntra specifying the intra prediction mode,<br>- a variable nTbW specifying the transform block width,<br>- a variable nTbH specifying the transform block height,<br>- a variable cIdx specifying the colour component of the current block.<br>Output of this process is the modified intra prediction mode predModeIntra.<br>The variables nW and nH are derived as follows:<br>- If IntraSubPartitionsSplitType is equal to ISP_NO_SPLIT or cIdx is not equal to 0, the following applies:<br>nW = nTbW    (8-111)<br>nH = nTbH    (8-112)<br>- Otherwise ( IntraSubPartitionsSplitType is not equal to ISP_NO_SPLIT and cIdx is equal to 0 ), the following applies:<br>nW = nCbW    (8-113)<br>nH = nCbH    (8-114)<br>The variable whRatio is set equal to Abs( Log2( nW / nH ) ).<br>For non-square blocks (nW is not equal to nH), the intra prediction mode predModeIntra is modified as follows:<br>- If all of the following conditions are true, predModeIntra is set equal to ( predModeIntra + 65 ).<br>   - nW is greater than nH<br>   - predModeIntra is greater than or equal to 2<br>   - predModeIntra is less than ( whRatio > 1 ) ? ( 8 + 2 * whRatio ) : 8<br>- Otherwise, if all of the following conditions are true, predModeIntra is set equal to ( predModeIntra − 67 ).<br>   - nH is greater than nW<br>   - predModeIntra is less than or equal to 66<br>- predModeIntra is greater than ( whRatio > 1 ) ? ( 60 − 2 * whRatio ) : 60 |

Input values of predModeIntra, nTbW, and nTbH in a mapping process shown in Table 11 are the same as the value of the variable predModeIntra updated in Table 9 and nTbW and nTbH referenced in Table 9, respectively.

In Table 11, nCbW and nCbH denote the width and height of a coding block corresponding to the transform block, respectively, and a variable IntraSubPartitionsSplitType denotes whether the ISP mode is applied, wherein IntraSubPartitionsSplitType equal to ISP_NO_SPLIT indicates that the coding unit is not partitioned by the ISP (i.e., the ISP mode is not applied). The variable IntraSubPartitionsSplitType not equal to ISP_NO_SPLIT indicates that the ISP mode is applied and thus the coding unit is partitioned into two or four partition blocks. In Table 11, cIdx is an index indicating a color component. A cIdx value equal to 0 denotes a luma block, and a cIdx value not equal to 0 indicates a chroma block. The predModeIntra value output through the mapping process of Table 11 is a value updated in consideration of whether a wide-angle intra prediction (WAIP) mode is applied.

With respect to the predModeIntra value updated through Table 11, an LFNST set may be determined through a mapping relationship shown in the following table.

TABLE 12

| predModeIntra | lfnstTrSetIdx |
|---|---|
| predModeIntra < 0 | 1 |
| 0 <= predModeIntra <= 1 | 0 |
| 2 <= predModeIntra <= 12 | 1 |
| 13 <= predModeIntra <= 23 | 2 |
| 24 <= predModeIntra <= 44 | 3 |
| 45 <= predModeIntra <= 55 | 2 |
| 56 <= predModeIntra <= 80 | 1 |

In the above table, lfnstTrSetIdx denotes an index indicating an LFNST set and has a value from 0 to 3, which indicates that a total of four LFNST sets are configured. Each LFNST set may include two transform kernels, that is, LFNST kernels (the transform kernels may be 16×16 matrices or 16×48 matrices based on a forward direction depending on a region to which an LFNST is applied), and a transform kernel to be applied among the two transform kernels may be specified through signaling of the LFNST index. In addition, it is possible to specify whether to apply the LFNST through the LFNST index. In the current VVC standard, the LFNST index may have values of 0, 1, and 2, 0 indicates that no LFNST is applied, and 1 and 2 indicate the two transform kernels, respectively.

The following drawings are provided to describe specific examples of the present disclosure. Since the specific designations of devices or the designations of specific signals/messages/fields illustrated in the drawings are provided for illustration, technical features of the present disclosure are not limited to specific designations used in the following drawings.

Figure 18:
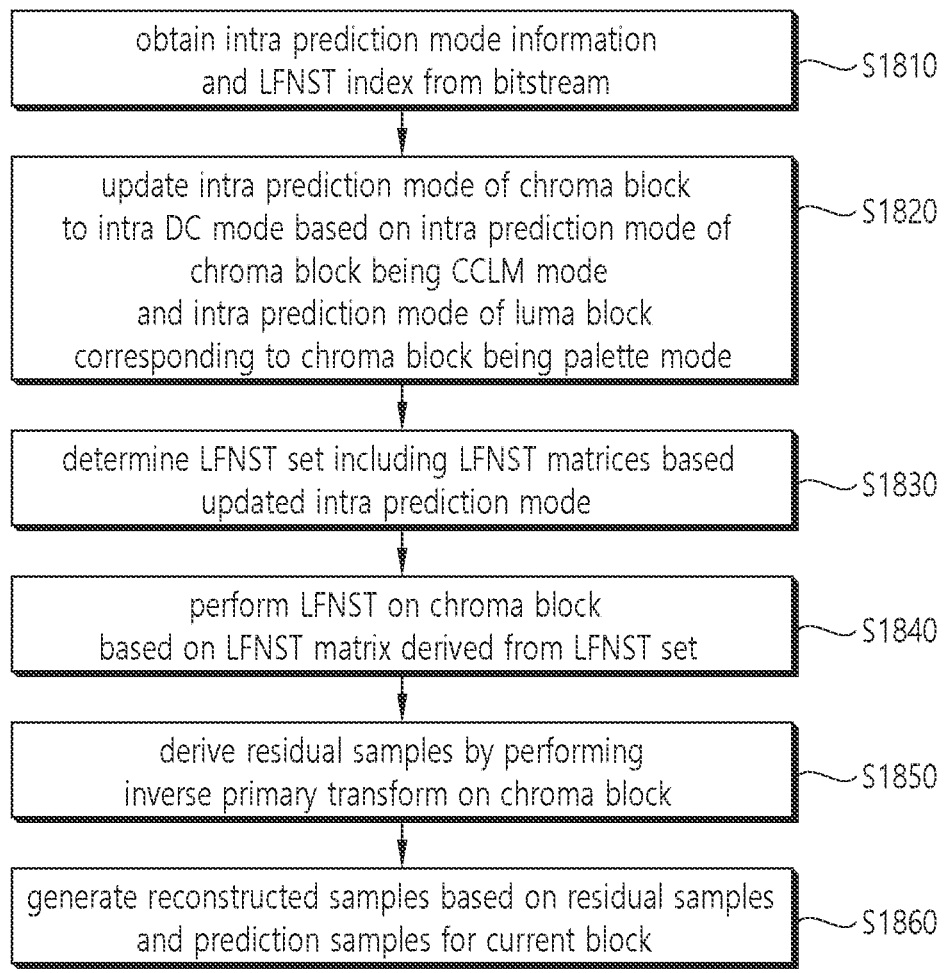
FIG. 18 is a flowchart for explaining an image decoding method according to an example.

FIG. 18 is a flowchart illustrating an operation of a video decoding apparatus according to an embodiment of the present disclosure.

Each process disclosed in FIG. 18 is based on some of details described with reference to FIG. 4 to FIG. 17. Therefore, a description of specific details overlapping the details described with reference to FIG. 3 to FIG. 17 will be omitted or will be schematically made.

The decoding apparatus 300 according to an embodiment may obtain intra prediction mode information and an LFNST index from a bitstream (S1810).

The intra prediction mode information may include an intra prediction mode for a neighboring block (e.g., a left and/or upper neighboring block) of a current block and an most probable mode (MPM) index indicating one of MPM candidates in an MPM list derived based on additional candidate modes or remaining intra prediction mode information indicating one of remaining intra prediction modes not included in the MPM candidates.

In addition, the intra mode information may include flag information sps_cclm_enabled_flag indicating whether a CCLM is applied to the current block and information intra_chroma_pred_mode about an intra prediction mode for a chroma component.

LFNST index information is received as syntax information, and the syntax information is received as a binarized bin string including 0 and 1.

A syntax element of the LFNST index according to the present embodiment may indicate whether an inverse LFNST or an inverse non-separable transform is applied and any one of transform kernel matrices included in a transform set, and when the transform set includes two transform kernel matrices, the syntax element of the transform index may have three values.

That is, according to an embodiment, the values of the syntax element of the LFNST index may include 0 indicating that no inverse LFNST is applied to a target block, 1 indicating a first transform kernel matrix among the transform kernel matrices, and 2 indicating a second transform kernel matrix among the transform kernel matrices.

The decoding apparatus 300 may decode information on quantized transform coefficients for the current block from the bitstream, and may derive quantized transform coefficients for the target block based on the information on the quantized transform coefficients for the current block. Information on the quantized transform coefficients for the target block may be included in a sequence parameter set (SPS) or a slice header and may include at least one of information on whether an RST is applied, information on a reduced factor, information on a minimum transform size for applying an RST, information on a maximum transform size for applying an RST, an inverse RST size, and information on a transform index indicating any one of transform kernel matrices included in a transform set.

The decoding apparatus 300 may derive transform coefficients by dequantizing residual information on the current block, that is, the quantized transform coefficients, and may arrange the derived transform coefficients in a predetermined scanning order.

Specifically, the derived transform coefficients may be arranged in 4×4 block units according to a reverse diagonal scan order, and transform coefficients in a 4×4 block may also be arranged according to the reverse diagonal scan order. That is, the dequantized transform coefficients may be arranged according to a reverse scan order applied in a video codec, such as in VVC or HEVC.

The transform coefficient derived based on the residual information may be the dequantized transform coefficient as described above, or may be quantized transform coefficients. That is, the transform coefficients may be any data for checking whether there is non-zero data in the current block regardless of quantization.

The decoding apparatus may update the intra prediction mode of the chroma block to the intra DC mode based on the intra prediction mode of the chroma block being the CCLM mode and the intra prediction mode of the luma block corresponding to the chroma block being the palette mode (S1820).

The decoding apparatus may derive an intra prediction mode for a chroma block as a CCLM mode based on the intra prediction mode information. For example, the decoding apparatus may receive information on the intra prediction mode for the current chroma block through the bitstream, and may derive the CCLM mode as the intra prediction mode for the current chroma block based on the intra prediction mode information.

The CCLM mode may include a top-left CCLM mode, a top CCLM mode, or a left CCLM mode.

As described above, the decoding apparatus may derive a residual sample by applying an LFNST, which is a non-separable transform, or an MTS, which is a separable transform, and these transforms may be performed respectively based on the LFNST index indicating an LFNST kernel, that is, an LFNST matrix, and an MTS index indicating an MTS kernel.

For the LFNST, an LFNST set needs to be determined, and the LFNST set has a mapping relationship with an intra prediction mode for the current block.

The decoding apparatus may update the intra prediction mode for the chroma block based on an intra prediction mode for a luma block corresponding to the chroma block for inverse LFNST of the chroma block.

According to an example, the updated intra prediction mode may be derived as an intra prediction mode corresponding to a specific position in the luma block, and the specific position may be set based on a color format of the chroma block.

The specific position may be a center position of the luma block and may be represented by ((xTbY+(nTbW*SubWidthC)/2), (yTbY+(nTbH*SubHeightC)/2)).

In the center position, xTbY and yTbY denote top-left coordinates of the luma block, that is, a top-left position in a luma sample reference for a current transform block, nTbW and nTbH denote the width and height of the chroma block, and SubWidthC and SubHeightC correspond to variables corresponding to the color format. ((xTbY+(nTbW*SubWidthC)/2), (yTbY+(nTbH*SubHeightC)/2)) denotes a center position of a luma transform block, and IntraPredModeY[xTbY+(nTbW*SubWidthC)/2][yTbY+(nTbH*SubHeightC)/2] denotes an intra prediction mode for the luma block for the position.

SubWidthC and SubHeightC may be derived as shown in Table 10. That is, when the color format is 4:2:0, SubWidthC and SubHeighC are 2, and when the color format is 4:2:2, SubWidthC is 2 and SubHeightC is 1.

As shown in Table 9, to designate the specific position of the luma block corresponding to the chroma block regardless of the color format, the color format is reflected in a variable indicating the specific position.

As described above, when the intra prediction mode of the luma block corresponding to the specific position is a palette mode, the decoding apparatus may update the updated intra prediction mode to an intra DC mode.

A palette coding is a useful technique for representing blocks that include a small number of unique color values. Instead of applying prediction and transform to the blocks, in the palette mode, an index to represent the value of each sample is signaled. In order to decode a block encoded using the palette mode, the decoder must decode a palette entry and index. The palette entry may be represented by a palette table and may be encoded by a palette table coding tool.

Alternatively, according to an example, when the intra prediction mode corresponding to the specific position is an intra block copy (IBC) mode, the decoding apparatus may set the updated intra prediction mode as the intra DC mode.

The IBC basically performs prediction in a current picture, but it may be performed similarly to inter prediction in that it derives a reference block in a current picture. That is, the IBC may use at least one of inter prediction techniques described in the present document.

The IBC prediction mode or the palette mode may be used for coding a content image/video including a game, for example, screen content coding (SCC). The IBC basically performs prediction within a current picture but may be performed similarly to inter prediction in that a reference block is derived within the current picture. That is, the IBC may use at least one of inter prediction techniques described in the present disclosure. The palette mode may be considered as an example of intra coding or intra prediction. When the palette mode is applied, a value of a sample in the picture may be signaled based on information on a palette table and a palette index.

Alternatively, according to an example, when the intra prediction mode of the luma block corresponding to the specific position is a matrix-based intra prediction (hereinafter, "MIP") mode, the decoding apparatus may set the updated intra prediction mode to an intra planar mode.

The MIP mode may be referred to as affine linear weighted intra prediction (ALWIP) or matrix weighted intra prediction (MWIP). When MIP is applied to the current block, prediction samples for the current block may be derived ii) by performing a matrix-vector multiplication procedure i) using neighboring reference samples which have been subjected to an averaging procedure and iii) by further performing a horizontal/vertical interpolation procedure.

In summary, when the intra prediction mode for the center position is the MIP mode, the IBC mode, and the palette mode, the intra prediction mode for the chroma block may be updated to a specific mode, such as the intra planar mode or the intra DC mode.

When the intra prediction mode for the center position is not the MIP mode, the IBC mode, and the palette mode, the intra prediction mode for the chroma block may be updated to the intra prediction mode of the luma block with respect to the center position in order to reflect an association between the chroma block and the luma block.

The decoding apparatus may determine an LFNST set including LFNST matrices based on the updated intra prediction mode (S1830), and may derive transform coefficients ry performing the LFNST on the chroma block based on an LFNST matrix derived from the LFNST set (S1840).

Any one of the plurality of LFNST matrices may be selected based on the LFNST set and the LFNST index.

As shown in Table 12, the LFNST transform set is derived according to the intra prediction mode, and 81 to 83 indicating the CCLM mode in the intra prediction mode are omitted, because the LFNST transform set is derived using an intra mode value for a corresponding luma block in the CCLM mode.

According to an example, as shown in Table 12, any one of the four LFNST sets may be determined according to the intra prediction mode for the current block, and an LFNST set to be applied to the current chroma block may also be determined.

The decoding apparatus may perform an inverse RST, for example, an inverse LFNST, by applying the LFNST matrix to the dequantized transform coefficients, thereby deriving modified transform coefficients for the current chroma block.

The decoding apparatus may derive residual samples from the transform coefficients through an inverse primary transform (S1850), and when the current block is a chroma block, residual samples for the chroma block may be derived based on transform coefficients. An MTS may be used in the inverse primary transform.

In addition, the decoding apparatus may generate reconstructed samples based on residual samples for the current block and prediction samples for the current block (S1860).

The following drawings are provided to describe specific examples of the present disclosure. Since the specific designations of devices or the designations of specific signals/messages/fields illustrated in the drawings are provided for illustration, technical features of the present disclosure are not limited to specific designations used in the following drawings.

Figure 19:
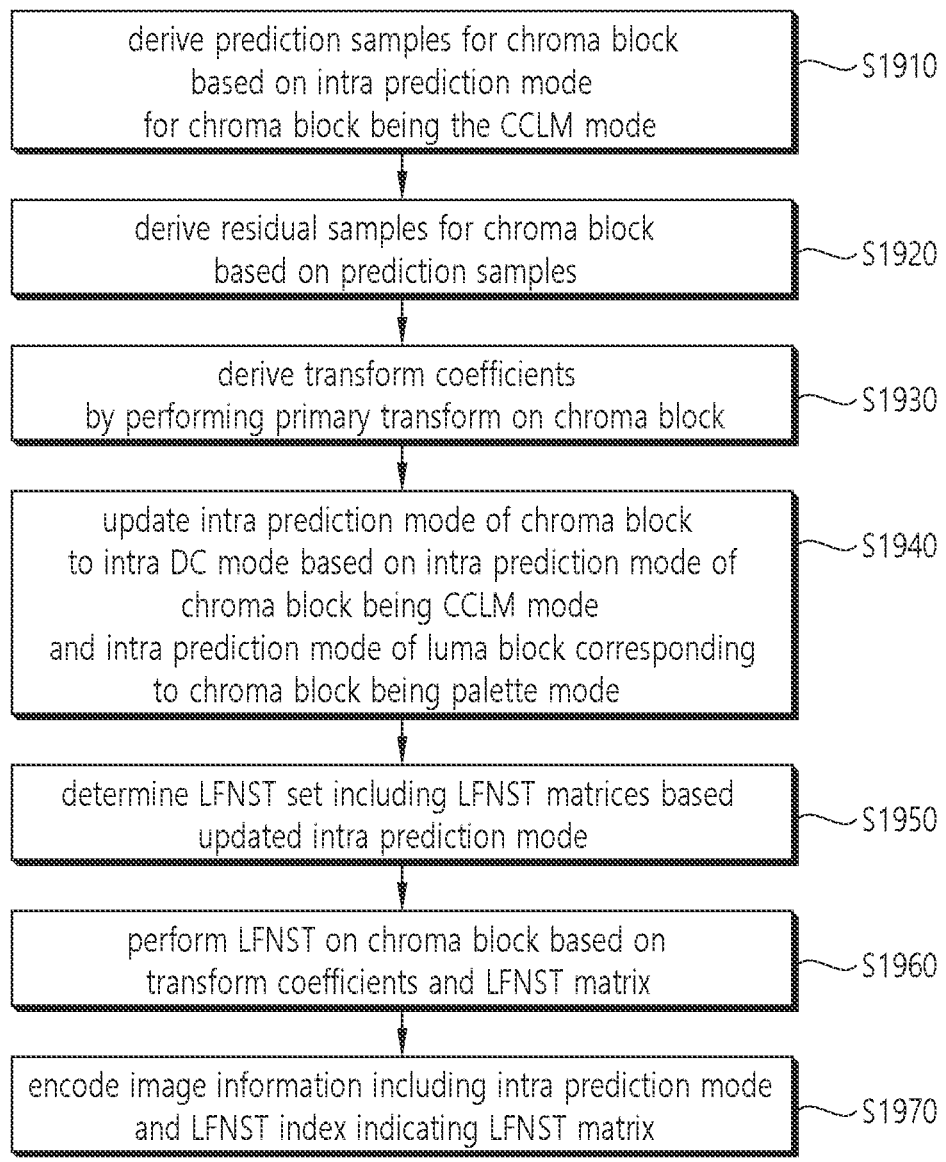
FIG. 19 is a flowchart for explaining an image encoding method according to an example.

FIG. 19 is a flowchart illustrating an operation of a video encoding apparatus according to an embodiment of the present disclosure.

Each process disclosed in FIG. 19 is based on some of details described with reference to FIG. 4 to FIG. 17. Therefore, a description of specific details overlapping the details described with reference to FIG. 2 and FIG. 4 to FIG. 17 will be omitted or will be schematically made.

According to an embodiment, the encoding apparatus 200 may derive prediction samples for the chroma block based on the intra prediction mode for the chroma block being the CCLM mode (S1910).

The encoding apparatus may first derive the intra prediction mode for the chroma block as the CCLM mode.

For example, the encoding apparatus may determine the intra prediction mode for the current chroma block based on a rate-distortion (RD) cost (or RDO). Here, the RD cost may be derived based on the sum of absolute differences (SAD). The encoding apparatus may determine the CCLM mode as the intra prediction mode for the current chroma block based on the RD cost.

The CCLM mode may include a top-left CCLM mode, a top CCLM mode, or a left CCLM mode.

The encoding apparatus may encode information on the intra prediction mode for the current chroma block, and the information on the intra prediction mode may be signaled through a bitstream. Prediction-related information on the current chroma block may include the information on the intra prediction mode.

According to an embodiment, the encoding apparatus may derive residual samples for the chroma block based on the prediction samples (S1920).

According to an embodiment, the encoding apparatus may derive transform coefficients for the chroma block based on a primary transform on the residual samples (S1930).

The primary transform may be performed through a plurality of transform kernels, in which case a transform kernel may be selected based on the intra prediction mode.

The encoding apparatus may update the intra prediction mode of the chroma block to the intra DC mode for LFNST of the chroma block based on the intra prediction mode of the chroma block being the CCLM mode and the intra prediction mode of the luma block corresponding to the chroma block being the palette mode (S1630).

As shown in Table 9, the encoding apparatus may update the CCLM mode for the chroma block based on the intra prediction mode for the luma block corresponding to the chroma block (—When predModeIntra is equal to either INTRA_LT_CCLM, INTRA_L_CCLM, or INTRA_T_CCLM, predModeIntra is derived as follow:).

According to an example, the updated intra prediction mode may be derived as an intra prediction mode corresponding to a specific position in the luma block, and the specific position may be set based on a color format of the chroma block.

The specific position may be a center position of the luma block and may be represented by ((xTbY+(nTbW*SubWidthC)/2), (yTbY+(nTbH*SubHeightC)/2)).

In the center position, xTbY and yTbY denote top-left coordinates of the luma block, that is, a top-left position in a luma sample reference for a current transform block, nTbW and nTbH denote the width and height of the chroma block, and SubWidthC and SubHeightC correspond to variables corresponding to the color format. ((xTbY+(nTbW*SubWidthC)/2), (yTbY+(nTbH*SubHeightC)/2)) denotes a center position of a luma transform block, and IntraPredModeY[xTbY+(nTbW*SubWidthC)/2][yTbY+(nTbH*SubHeightC)/2] denotes an intra prediction mode for the luma block for the position.

SubWidthC and SubHeightC may be derived as shown in Table 10. That is, when the color format is 4:2:0, SubWidthC and SubHeightC are 2, and when the color format is 4:2:2, SubWidthC is 2 and SubHeightC is 1.

As shown in Table 9, to designate the specific position of the luma block corresponding to the chroma block regardless of the color format, the color format is reflected in a variable indicating the specific position.

As described above, when the intra prediction mode of the luma block corresponding to the specific position is a palette mode, the encoding apparatus may update the updated intra prediction mode to an intra DC mode. A palette coding is a useful technique for representing blocks that include a small number of unique color values. Instead of applying prediction and transform to the blocks, in the palette mode, an index to represent the value of each sample is signaled. In order to decode a block encoded using the palette mode, the decoder must decode a palette entry and index. The palette entry may be represented by a palette table and may be encoded by a palette table coding tool.

Alternatively, according to an example, when the intra prediction mode corresponding to the specific position is an intra block copy (IBC) mode, the encoding apparatus may set the updated intra prediction mode as the intra DC mode.

The IBC basically performs prediction in a current picture, but it may be performed similarly to inter prediction in that it derives a reference block in a current picture. That is, the IBC may use at least one of inter prediction techniques described in the present document.

The IBC prediction mode or the palette mode may be used for coding a content image/video including a game, for example, screen content coding (SCC). The IBC basically performs prediction within a current picture but may be performed similarly to inter prediction in that a reference block is derived within the current picture. That is, the IBC may use at least one of inter prediction techniques described in the present disclosure. The palette mode may be considered as an example of intra coding or intra prediction. When the palette mode is applied, a value of a sample in the picture may be signaled based on information on a palette table and a palette index.

Alternatively, according to an example, when the intra prediction mode of the luma block corresponding to the specific position is a matrix-based intra prediction (hereinafter, "MIP") mode, the decoding apparatus may set the updated intra prediction mode to an intra planar mode.

The MIP mode may be referred to as affine linear weighted intra prediction (ALWIP) or matrix weighted intra prediction (MWIP). When MIP is applied to the current block, prediction samples for the current block may be derived ii) by performing a matrix-vector multiplication procedure i) using neighboring reference samples which have been subjected to an averaging procedure and iii) by further performing a horizontal/vertical interpolation procedure.

In summary, when the intra prediction mode for the center position is the MIP mode, the IBC mode, and the palette mode, the intra prediction mode for the chroma block may be updated to a specific mode, such as the intra planar mode or the intra DC mode.

When the intra prediction mode for the center position is not the MIP mode, the IBC mode, and the palette mode, the intra prediction mode for the chroma block may be updated to the intra prediction mode of the luma block with respect to the center position in order to reflect an association between the chroma block and the luma block.

The encoding apparatus may determine an LFNST set including LFNST matrices based on the updated intra prediction mode (S1950), and may derive transform coefficients by performing an LFNST on the chroma block based on residual samples and the LFNST matrix (S1960).

The encoding apparatus may determine the transform set based on a mapping relationship according to the intra prediction mode applied to the current block and may perform an LFNST, that is, a non-separable transform, based on any one of two LFNST matrices included in the transform set.

As described above, a plurality of transform sets may be determined according to an intra prediction mode for a transform block to be transformed. A matrix applied to the LFNST is the transpose of a matrix used in an inverse LFNST In one example, the LFNST matrix may be a non-square matrix in which the number of rows is smaller than the number of columns.

The encoding apparatus may derive quantized transform coefficients by performing quantization based on the modified transform coefficients for the current chroma block and may encode and output image information including information on the quantized transform coefficients, information on the intra prediction mode, and an LFNST index indicating the LFNST matrix (S1970).

Specifically, the encoding apparatus 200 may generate the information on the quantized transform coefficients and may encode the generated information on the quantized transform coefficients.

In one example, the information on the quantized transform coefficients may include at least one of information on whether the LFNST is applied, information on a reduced factor, information on a minimum transform size for applying the LFNST, and information on a maximum transform size for applying the LFNST.

The encoding apparatus may encode, as the information on the intra mode, flag information indicating whether the CCLM is applied to the current block, which is sps_cclm_enabled_flag, and information on an intra prediction mode for a chroma component, which is intra_chroma_pred_mode.

The information on the CCLM mode, which is intra-chroma_pred_mode, may indicate the top-left CCLM mode, the top CCLM mode, or the left CCLM mode.

In the present disclosure, at least one of quantization/dequantization and/or transform/inverse transform may be omitted. When quantization/dequantization is omitted, a quantized transform coefficient may be referred to as a transform coefficient. When transform/inverse transform is omitted, the transform coefficient may be referred to as a coefficient or a residual coefficient, or may still be referred to as a transform coefficient for consistency of expression.

In addition, in the present disclosure, a quantized transform coefficient and a transform coefficient may be referred to as a transform coefficient and a scaled transform coefficient, respectively. In this case, residual information may include information on a transform coefficient(s), and the information on the transform coefficient(s) may be signaled through a residual coding syntax. Transform coefficients may be derived based on the residual information (or information on the transform coefficient(s)), and scaled transform coefficients may be derived through inverse transform (scaling) of the transform coefficients. Residual samples may be derived based on the inverse transform (transform) of the scaled transform coefficients. These details may also be applied/expressed in other parts of the present disclosure.

In the above-described embodiments, the methods are explained on the basis of flowcharts by means of a series of steps or blocks, but the present disclosure is not limited to the order of steps, and a certain step may be performed in order or step different from that described above, or concurrently with another step. Further, it may be understood by a person having ordinary skill in the art that the steps shown in a flowchart are not exclusive, and that another step may be incorporated or one or more steps of the flowchart may be removed without affecting the scope of the present disclosure.

The above-described methods according to the present disclosure may be implemented as a software form, and an encoding apparatus and/or decoding apparatus according to the disclosure may be included in a device for image processing, such as, a TV, a computer, a smartphone, a set-top box, a display device or the like.

When embodiments in the present disclosure are embodied by software, the above-described methods may be embodied as modules (processes, functions or the like) to perform the above-described functions. The modules may be stored in a memory and may be executed by a processor. The memory may be inside or outside the processor and may be connected to the processor in various well-known manners. The processor may include an application-specific integrated circuit (ASIC), other chipset, logic circuit, and/or a data processing device. The memory may include a read-only memory (ROM), a random access memory (RAM), a flash memory, a memory card, a storage medium, and/or other storage device. That is, embodiments described in the present disclosure may be embodied and performed on a processor, a microprocessor, a controller or a chip. For example, function units shown in each drawing may be embodied and performed on a computer, a processor, a microprocessor, a controller or a chip.

Further, the decoding apparatus and the encoding apparatus to which the present disclosure is applied, may be included in a multimedia broadcasting transceiver, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an over the top (OTT) video device, an Internet streaming service providing device, a three-dimensional (3D) video device, a video telephony video device, and a medical video device, and may be used to process a video signal or a data signal. For example, the over the top (OTT) video device may include a game console, a Blu-ray player, an Internet access TV, a Home theater system, a smartphone, a Tablet PC, a digital video recorder (DVR) and the like.

In addition, the processing method to which the present disclosure is applied, may be produced in the form of a program executed by a computer, and be stored in a computer-readable recording medium. Multimedia data having a data structure according to the present disclosure may also be stored in a computer-readable recording medium. The computer-readable recording medium includes all kinds of storage devices and distributed storage devices in which computer-readable data are stored. The computer-readable recording medium may include, for example, a Blu-ray Disc (BD), a universal serial bus (USB), a ROM, a PROM, an EPROM, an EEPROM, a RAM, a CD-ROM, a magnetic tape, a floppy disk, and an optical data storage device. Further, the computer-readable recording medium includes media embodied in the form of a carrier wave (for example, transmission over the Internet). In addition, a bitstream generated by the encoding method may be stored in a computer-readable recording medium or transmitted through a wired or wireless communication network. Additionally, the embodiments of the present disclosure may be embodied as a computer program product by program codes, and the program codes may be executed on a computer by the embodiments of the present disclosure. The program codes may be stored on a computer-readable carrier.

Figure 20:
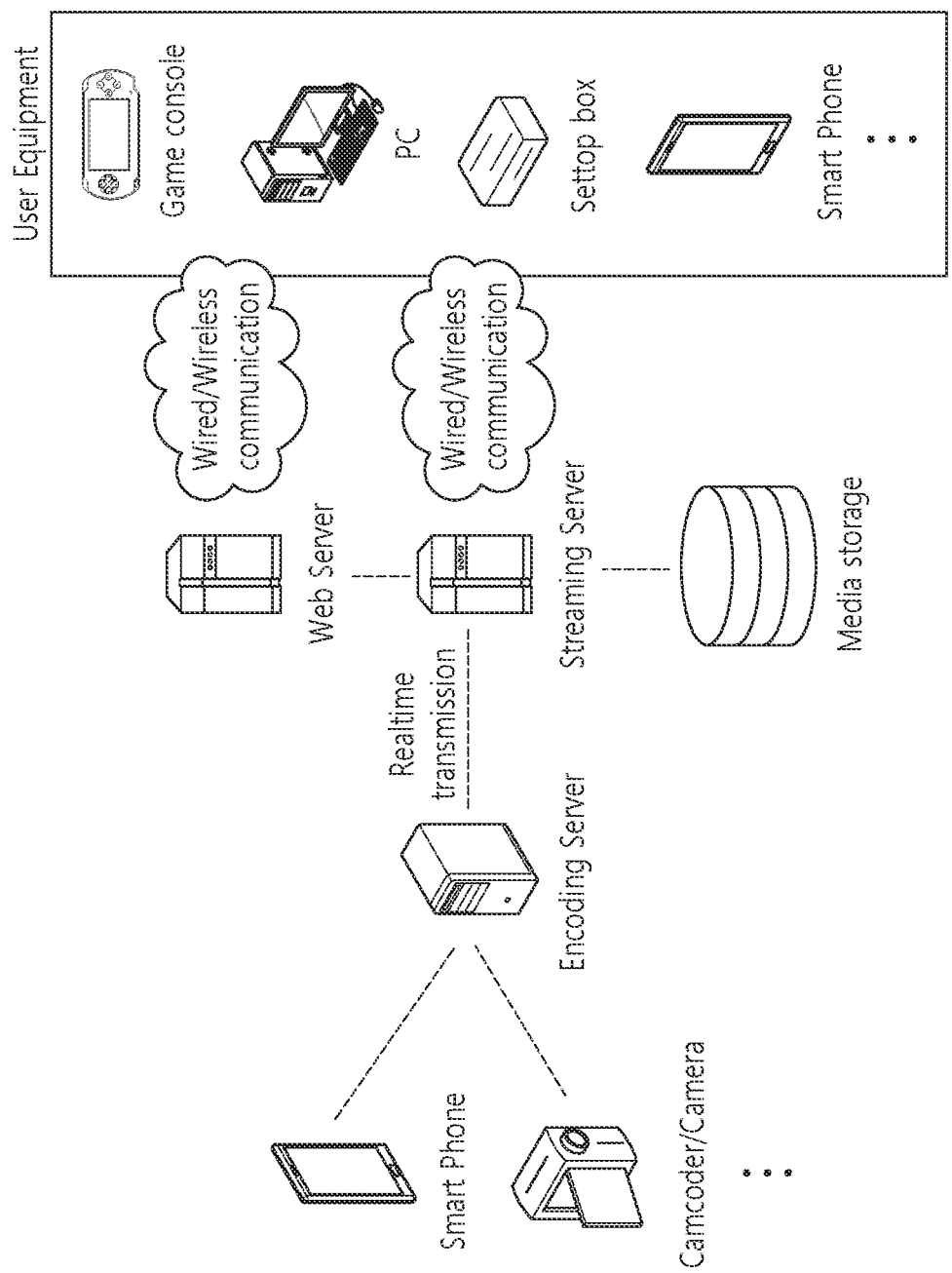
FIG. 20 illustrates the structure of a content streaming system to which the present disclosure is applied.

FIG. 20 illustrates the structure of a content streaming system to which the present disclosure is applied.

Further, the contents streaming system to which the present disclosure is applied may largely include an encoding server, a streaming server, a web server, a media storage, a user equipment, and a multimedia input device.

The encoding server functions to compress to digital data the contents input from the multimedia input devices, such as the smart phone, the camera, the camcoder and the like, to generate a bitstream, and to transmit it to the streaming server. As another example, in a case where the multimedia input device, such as, the smart phone, the camera, the camcoder or the like, directly generates a bitstream, the encoding server may be omitted. The bitstream may be generated by an encoding method or a bitstream generation method to which the present disclosure is applied. And the streaming server may store the bitstream temporarily during a process to transmit or receive the bitstream.

The streaming server transmits multimedia data to the user equipment on the basis of a user's request through the web server, which functions as an instrument that informs a user of what service there is. When the user requests a service which the user wants, the web server transfers the request to the streaming server, and the streaming server transmits multimedia data to the user. In this regard, the contents streaming system may include a separate control server, and in this case, the control server functions to control commands/responses between respective equipments in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like. Each of servers in the contents streaming system may be operated as a distributed server, and in this case, data received by each server may be processed in distributed manner.

Claims disclosed herein can be combined in a various way. For example, technical features of method claims of the present disclosure can be combined to be implemented or performed in an apparatus, and technical features of apparatus claims can be combined to be implemented or performed in a method. Further, technical features of method claims and apparatus claims can be combined to be implemented or performed in an apparatus, and technical features of method claims and apparatus claims can be combined to be implemented or performed in a method.

What is claimed is:

1. An image decoding method performed by a decoding apparatus, the method comprising:
    obtaining intra prediction mode information and an LFNST index from a bitstream;
    updating an intra prediction mode of a chroma block to an intra DC based on the intra prediction mode of the chroma block being a cross-component linear model (CCLM) mode and a prediction mode of a luma block corresponding to the chroma block being a palette mode;
    determining an LFNST set comprising LFNST matrices based on the updated intra prediction mode; and
    performing an LFNST on the chroma block based on a LFNST matrix derived from the LFNST set,
    wherein the palette mode is the prediction mode corresponding to a specific position in the luma block,
    wherein the specific position is set to ((xTbY+(nTbW*SubWidthC)/2), (yTbY+(nTbH*SubHeightC)/2)),
    wherein xTbY and yTbY denote top-left coordinates of the luma block,
    wherein nTbW and nTbH denote a width and a height of the chroma block, and
    wherein SubWidthC and SubHeightC denote variables corresponding to the color format.

2. The image decoding method of claim 1, wherein the specific position is set based on a color format of the chroma block.

3. The image decoding method of claim 2, wherein the specific position is a center position of the luma block.

4. The image decoding method of claim 1, wherein when the color format is 4:2:0, SubWidthC and SubHeightC are 2, and
    wherein when the color format is 4:2:2, SubWidthC is 2 and SubHeightC is 1.

5. The image decoding method of claim 1, wherein when an intra prediction type corresponding to the specific position is an MW mode, the intra prediction mode of the chroma block is updated to an intra planar mode.

6. The image decoding method of claim 1, wherein when the prediction mode corresponding to the specific position is an IBC mode, the intra prediction mode of the chroma block is updated to an intra DC mode.

7. An image encoding method performed by an image encoding apparatus, the method comprising:
    deriving prediction samples for a chroma block based on an intra prediction mode for the chroma block being a cross-component linear model (CCLM) mode;
    deriving residual samples for the chroma block based on the prediction samples;
    updating an intra prediction mode of a chroma block to an intra DC based on the intra prediction mode of the chroma block being a cross-component linear model (CCLM) mode and a prediction mode of a luma block corresponding to the chroma block being a palette mode;
    determining an LFNST set comprising LFNST matrices based on the updated intra prediction mode; and
    performing an LFNST on the chroma block based on the residual samples and a LFNST matrix,
    wherein the palette mode is the prediction mode corresponding to a specific position in the luma block, wherein the specific position is set to ((xTbY+(nTbW*SubWidthC)/2), (yTbY+(nTbH*SubHeightC)/2)), wherein xTbY and yTbY denote top-left coordinates of the luma block, wherein nTbW and nTbH denote a width and a height of the chroma block, and wherein SubWidthC and SubHeightC denote variables corresponding to the color format.

8. The image encoding method of claim 7, wherein the specific position is set based on a color format of the chroma block.

9. The image encoding method of claim 8, wherein the specific position is a center position of the luma block.

10. The image encoding method of claim 7, wherein when the color format is 4:2:0, SubWidthC and SubHeightC are 2, and wherein when the color format is 4:2:2, SubWidthC is 2 and SubHeightC is 1.

11. The image encoding method of claim 7, wherein when an intra prediction type corresponding to the specific position is an MW mode, the intra prediction mode of the chroma block is updated to an intra planar mode.

12. The image encoding method of claim 7, wherein when the prediction mode corresponding to the specific position is an IBC mode, the intra prediction mode of the chroma block is updated to an intra DC mode.

13. A non-transitory computer-readable digital storage medium that stores a bitstream generated by the image encoding method of claim 7.

14. A transmitting method of data for an image, the method comprising:

obtaining a bitstream for the image, wherein the bitstream is generated based on deriving prediction samples for a chroma block based on an intra prediction mode for the chroma block being a cross-component linear model (CCLM) mode; deriving residual samples for the chroma block based on the prediction samples; updating an intra prediction mode of a chroma block to an intra DC based on the intra prediction mode of the chroma block being a cross-component linear model (CCLM) mode and a prediction mode of a luma block corresponding to the chroma block being a palette mode; determining an LFNST set comprising LFNST matrices based on the updated intra prediction mode; performing an LFNST on the chroma block based on the residual samples and a LFNST matrix; and encoding residual information related to the modified transform coefficients to generate the bitstream;

transmitting the data comprising the bitstream, wherein the palette mode is the prediction mode corresponding to a specific position in the luma block, wherein the specific position is set to ((xTbY+(nTbW*SubWidthC)/2), (yTbY+(nTbH*SubHeightC)/2)), wherein xTbY and yTbY denote top-left coordinates of the luma block, wherein nTbW and nTbH denote a width and a height of the chroma block, and wherein SubWidthC and SubHeightC denote variables corresponding to the color format.

* * * * *